United States Patent
Koga et al.

(10) Patent No.: US 11,402,818 B2
(45) Date of Patent: Aug. 2, 2022

(54) NUMERICAL CONTROLLER AND DATA STRUCTURE

(71) Applicant: FANUC CORPORATION, Yamanashi (JP)

(72) Inventors: Daijirou Koga, Yamanashi (JP); Nobuhito Oonishi, Yamanashi (JP); Manabu Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/838,894

(22) Filed: Dec. 12, 2017

(65) Prior Publication Data

US 2018/0164782 A1 Jun. 14, 2018

(30) Foreign Application Priority Data

Dec. 12, 2016 (JP) ............................. JP2016-240446
Oct. 5, 2017 (JP) ............................. JP2017-195303
Dec. 5, 2017 (JP) ............................. JP2017-233786

(51) Int. Cl.
*G05B 19/408* (2006.01)
*G05B 19/19* (2006.01)
(Continued)

(52) U.S. Cl.
CPC ......... *G05B 19/4086* (2013.01); *G05B 19/19* (2013.01); *G05B 19/41* (2013.01); *G05B 19/4141* (2013.01); *G05B 2219/34348* (2013.01)

(58) Field of Classification Search
CPC ................ G05B 19/19; G05B 19/4086; G05B 2219/34348; G05B 19/4141; G05B 19/41
(Continued)

(56) References Cited

U.S. PATENT DOCUMENTS 2,763,781 A * 9/1956 Wernlund ............ G05B 11/013
361/158
3,699,317 A * 10/1972 Middleditch ........ G05B 19/414
700/187
(Continued)

FOREIGN PATENT DOCUMENTS

DE 197 39 559 3/1999
JP 03-276307 12/1991
(Continued)

OTHER PUBLICATIONS

Notification of Reasons for Refusal issued to Japanese Patent Application No. 2017-233786, dated Sep. 4, 2018.
(Continued)

*Primary Examiner* — Muhammad S Islam
*Assistant Examiner* — Devon A Joseph
(74) *Attorney, Agent, or Firm* — Wenderoth, Lind & Ponack, L.L.P.

(57) ABSTRACT

A numerical controller which can freely and easily specify, as a control point, various positions on a machine configuration and which can easily set coordinate systems in places on the machine configuration. A numerical controller expresses the machine configuration of a control target in graph form where constituent elements are nodes and holds the machine configuration. The numerical controller includes: a control point coordinate system specification portion that specifies, with the identifier, one or more groups of the control point and the coordinate system; a command value determination portion that uses the specified control point and the coordinate system to determine for which control point and on which coordinate system one or more command values commanded in a program correspond to a coordinate value; and a movement command portion that
(Continued)

commands a move of the control point such that the coordinate value of the control point is the command value.

12 Claims, 39 Drawing Sheets

(51) Int. Cl.
*G05B 19/41* (2006.01)
*G05B 19/414* (2006.01)

(58) Field of Classification Search
USPC .......................................................... 318/569
See application file for complete search history.

(56) References Cited

U.S. PATENT DOCUMENTS

| | | | | |
|---|---|---|---|---|
| 4,866,631 A * | 9/1989 | Kuragano | ............ | G05B 19/41 708/275 |
| 5,060,164 A * | 10/1991 | Yoneda | ................ | G05B 19/184 700/187 |
| 5,779,749 A * | 7/1998 | Nafziger | ........... | G05B 19/40937 65/29.11 |
| 5,904,745 A * | 5/1999 | Nafziger | ................ | C03B 9/453 700/158 |
| 6,019,554 A * | 2/2000 | Hong | ................... | G05B 19/409 409/80 |
| 6,587,747 B2 * | 7/2003 | Hirai | .................. | G05B 19/4099 318/568.15 |
| 6,675,061 B2 * | 1/2004 | Hirai | .................. | G05B 19/4103 318/568.15 |
| 6,775,586 B2 | 8/2004 | Shibata et al. | | |
| 6,850,806 B2 * | 2/2005 | Yutkowitz | ............ | G05B 19/404 703/2 |
| 6,865,499 B2 * | 3/2005 | Yutkowitz | ............ | G05B 19/404 318/632 |
| 6,922,606 B1 * | 7/2005 | Yutkowitz | .......... | G05B 19/4103 318/560 |
| 7,847,506 B2 * | 12/2010 | Ogawa | ................ | G05B 19/416 318/560 |
| 7,899,574 B2 * | 3/2011 | Ogawa | ............... | G05B 19/4069 700/177 |
| 8,010,302 B2 * | 8/2011 | Okita | ................... | G05B 19/409 702/41 |
| 8,024,068 B2 * | 9/2011 | Gray | ...................... | B25J 9/1602 700/262 |
| 8,145,347 B2 * | 3/2012 | Nakamura | ......... | G05B 19/4103 700/192 |
| 8,868,228 B2 * | 10/2014 | Otsuki | ................. | G05B 19/41 700/193 |
| 8,924,004 B2 * | 12/2014 | Iwashita | .............. | G05B 19/402 700/186 |
| 9,304,507 B2 * | 4/2016 | Tezuka | ............... | G05B 19/4069 |
| 9,317,029 B2 * | 4/2016 | Morfino | ............ | G05B 19/4069 |
| 9,519,279 B2 * | 12/2016 | Tezuka | ................ | G05B 19/188 |
| 10,011,011 B2 * | 7/2018 | Sugaya | .................. | B25J 9/1671 |
| 10,099,380 B2 * | 10/2018 | Ishige | .................... | B25J 9/1697 |
| 2003/0120376 A1 | 6/2003 | Shibata et al. | | |
| 2007/0041023 A1 * | 2/2007 | Suzuki | ................. | G01B 21/045 356/605 |
| 2007/0233280 A1 * | 10/2007 | Bacon | .................... | B25J 9/1605 700/1 |
| 2008/0058982 A1 * | 3/2008 | Gray | ...................... | G05B 19/19 409/80 |
| 2011/0028179 A1 * | 2/2011 | Sawai | ................. | H04W 52/245 455/522 |
| 2011/0148942 A1 * | 6/2011 | Furihata | ................. | G09G 5/003 345/690 |
| 2013/0335452 A1 * | 12/2013 | Suchomel | ............ | G06T 11/203 345/660 |
| 2014/0244024 A1 * | 8/2014 | Tezuka | ................. | G05B 19/188 700/180 |
| 2015/0012127 A1 * | 1/2015 | Murakami | ......... | G05B 19/4083 700/189 |
| 2016/0320764 A1 * | 11/2016 | Ogawa | .................... | G05B 15/02 |
| 2016/0332297 A1 * | 11/2016 | Sugaya | .................... | B25J 9/161 |
| 2017/0003670 A1 * | 1/2017 | Kanemaru | ........... | G05B 19/416 |
| 2017/0160722 A1 * | 6/2017 | Kawai | .................. | G05B 19/409 |
| 2018/0074476 A1 * | 3/2018 | Uematsu | ................ | G05B 19/19 |
| 2018/0217574 A1 * | 8/2018 | Oonishi | ................ | G05B 19/042 |

FOREIGN PATENT DOCUMENTS

| | | |
|---|---|---|
| JP | 09-314487 | 12/1997 |
| JP | 2003-195917 | 7/2003 |
| JP | 2013/176212 | 11/2013 |
| JP | 2016-000442 | 1/2016 |

OTHER PUBLICATIONS

Takahiro Tsukishima et al., "Study on General Theory of Kinematics and Dynamics of Wheeled Mobile Robots", JRSJ vol. 8, No. 6, Dec. 1990, pp. 59-71 (with English language Abstract and pertinent section in the Japanese Office Action for Application No. 2017-233786).

Office Action dated Jun. 11, 2021 in German Patent Application No. 10 2017 222 474.6.

* cited by examiner

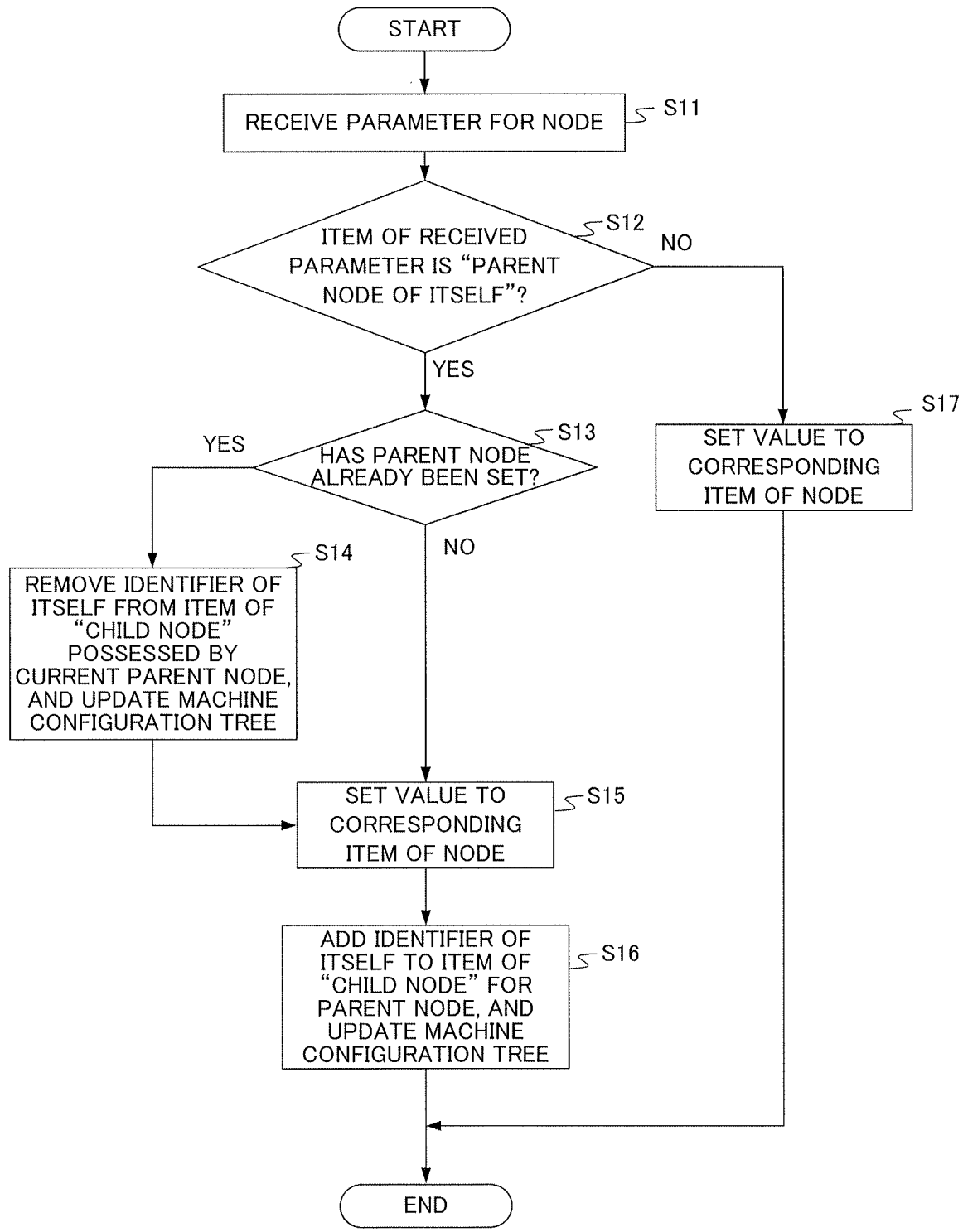

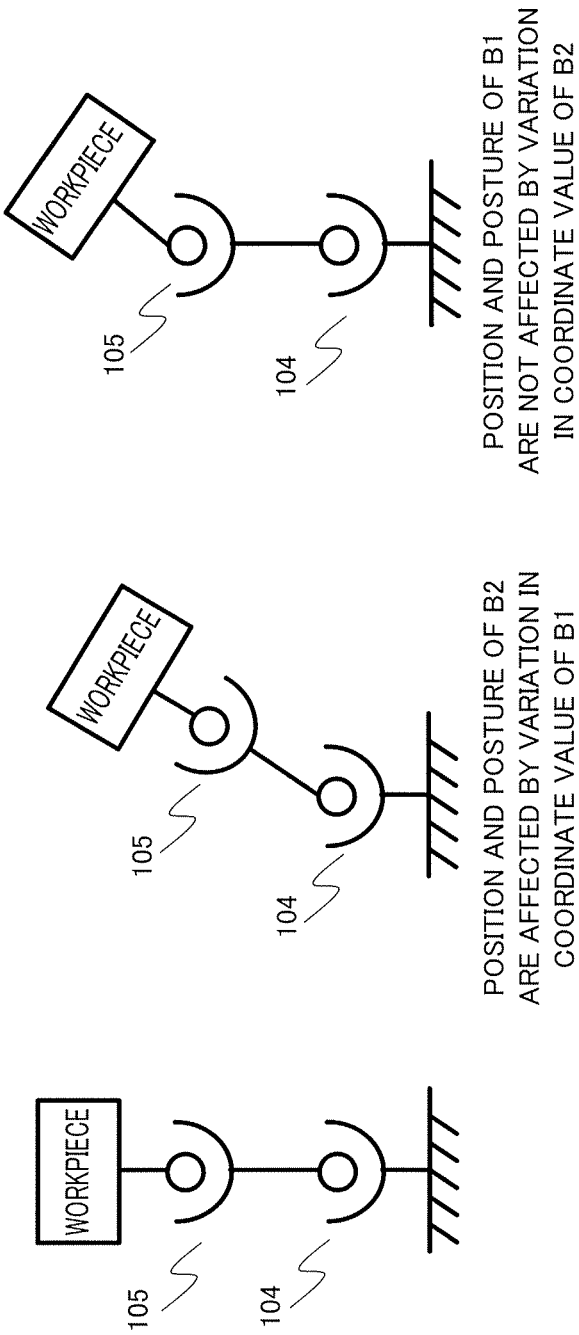

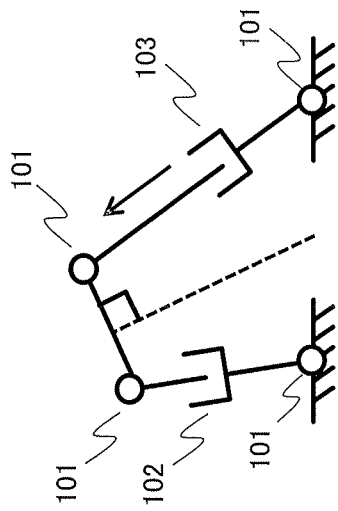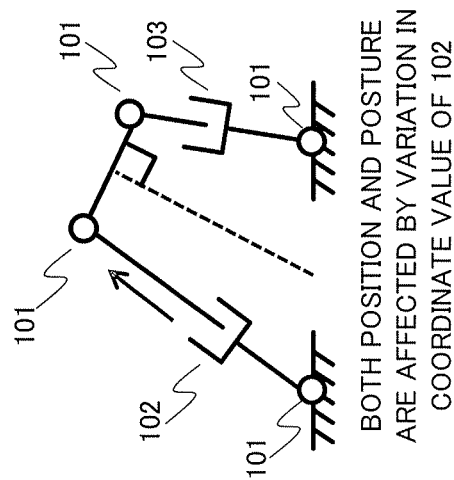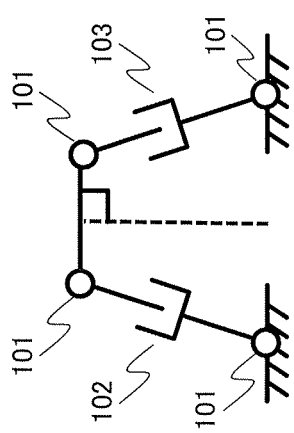
FIG. 10B
BOTH POSITION AND POSTURE ARE AFFECTED BY VARIATION IN COORDINATE VALUE OF 102

FIG. 12
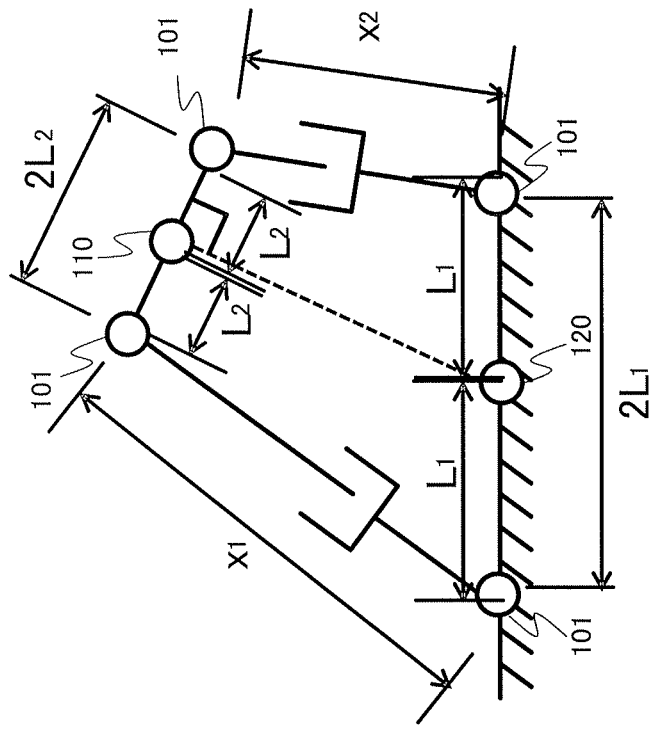
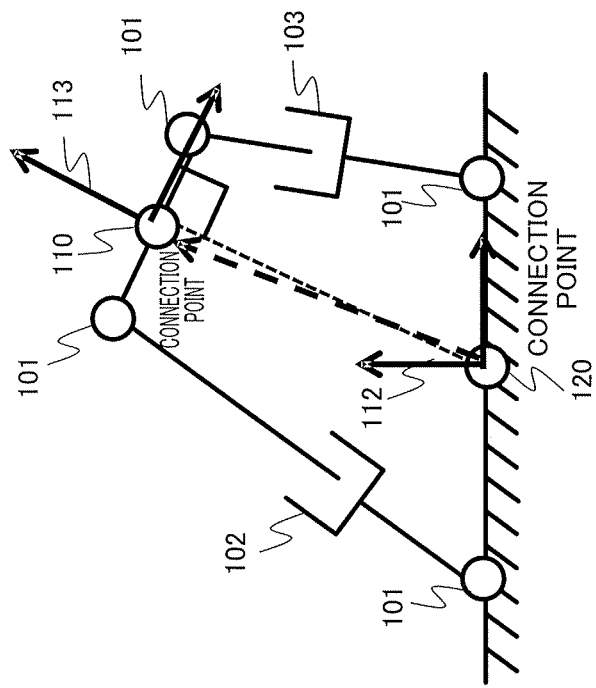
HOMOGENEOUS MATRIX $M_A$ INDICATING POSITION AND POSTURE OF CONNECTION POINT 120
HOMOGENEOUS MATRIX $M_B$ INDICATING POSITION AND POSTURE OF CONNECTION POINT 110

FIG. 16

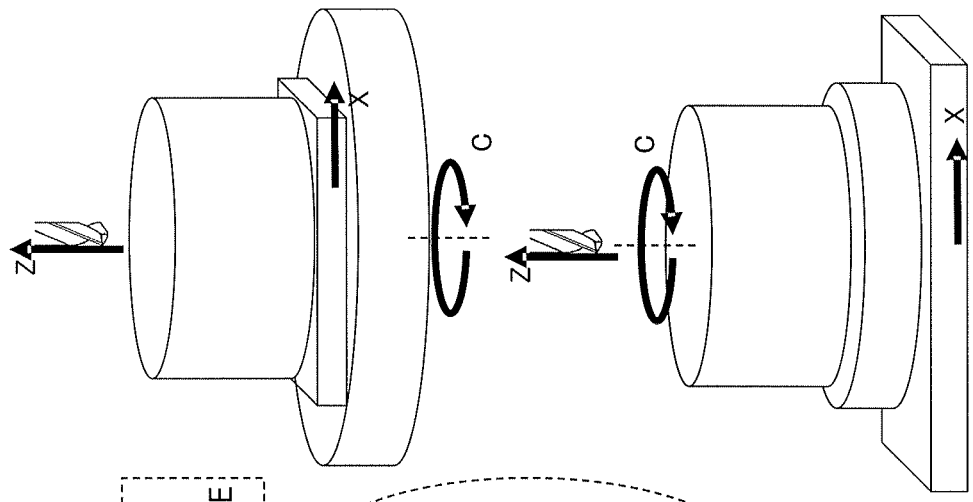

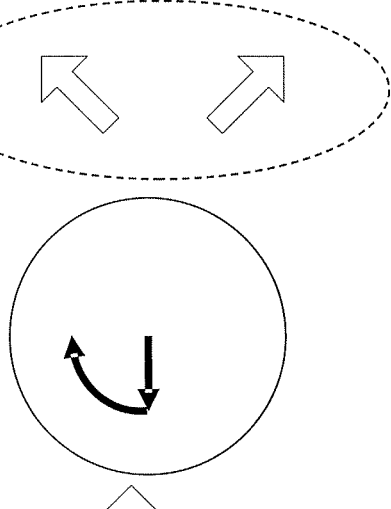

HOW POSITION AND POSTURE COMMANDED ARE REALIZED IS DETERMINED BY NUMERICAL CONTROLLER BASED ON MACHINE CONFIGURATION DATA

218 —
DEFINE ARBITRARY ADDRESS NAME
G55.9  L1=α  L2=β
α : FIRST LINEAR AXIS POSITION OF ORTHOGONAL COORDINATE SYSTEM
β : SECOND LINEAR AXIS POSITION OF ORTHOGONAL COORDINATE SYSTEM
G55.9  V1=I  V2=J  V3=K
I : FIRST ELEMENT OF TOOL POSTURE VECTOR
J : SECOND ELEMENT OF TOOL POSTURE VECTOR
K : THIRD ELEMENT OF TOOL POSTURE VECTOR
G55.9  R1=ROTA  R2=ROTB
A : FIRST ROTARY AXIS POSITION FOR DETERMINING TOOL POSTURE
B : SECOND ROTARY AXIS POSITION FOR DETERMINING TOOL POSTURE

219 —
HEREINAFTER, PROGRAM WITH α, β
G01 α -50. F100.
G17 G02 α0 β 50. R50.

220 —
BOTH VECTOR COMMAND AND ROTARY AXIS COMMAND CAN BE USED
G01 I1.0 J0.5 K0.2
G01 ROTA20.0 ROTB40.0

MACHINE CONFIGURATION 300

MACHINE CONFIGURATION TREE

FIG. 26

===== SPECIFY COORDINATE SYSTEM =====
G54.9 <WORKPIECE 1>;  // A NODE [WORKPIECE 1] IS SPECIFIED AS THE COORDINATE SYSTEM
G54.8 P<WORKPIECE 1> <WORK1>;  // ANOTHER IDENTIFIER OF "WORK1" IS SET TO THE NODE [WORKPIECE 1]
G54.9 P<WORK1>;  // THE NODE [WORKPIECE 1] IS SPECIFIED BY ANOTHER IDENTIFIER OF "WORK1" AS THE COORDINATE SYSTEM

G54.7 P<C1> X_Y_Z_;  // THE COORDINATE SYSTEM CROSS-OFFSET OF A NODE [C1] IS SET
G54.6 P<C1> I_J_K_;  // THE COORDINATE SYSTEM POSTURE MATRIX OF THE NODE [C1] IS SET BY ROLL/PITCH/YAW
G54.9 P<C1>;  // THE NODE [C1] IS SPECIFIED AS THE COORDINATE SYSTEM, AND THE CROSS-OFFSET AND THE POSTURE MATRIX DESCRIBED ABOVE ARE ADDED

===== SPECIFY CONTROL POINT =====
G43.9 <TOOL 1>;  // A NODE [TOOL 1] IS SPECIFIED AS THE CONTROL POINT
G43.8 P<TOOL 1> <TOOL1>;  // ANOTHER IDENTIFIER OF "TOOL1" IS SET TO THE NODE [TOOL 1]
G43.9 P<TOOL1>;  // THE NODE [TOOL 1] IS SPECIFIED BY ANOTHER IDENTIFIER OF "TOOL1" AS THE CONTROL POINT

G43.7 P<B1> X_Y_Z_;  // THE CONTROL POINT CROSS-OFFSET OF A NODE [B1] IS SET
G43.6 P<B1> I_J_K_;  // THE CONTROL POINT POSTURE MATRIX OF THE NODE [B1] IS SET BY ROLL/PITCH/YAW
G43.9 P<B1>;  // THE NODE [B1] IS SPECIFIED AS THE CONTROL POINT, AND THE CROSS-OFFSET AND THE POSTURE MATRIX DESCRIBED ABOVE ARE ADDED

FIG. 27

```
===== SPECIFY COORDINATE SYSTEM =====
G54.9 <COORINATE SYSTEM [WORKPIECE 1]>;   // A NODE "COORDINATE SYSTEM [WORKPIECE 1]" IS SPECIFIED AS
THE COORDINATE SYSTEM
G54.8 P<COORDINATE SYSTEM [WORKPIECE 1]> <WORK1>;   // ANOTHER IDENTIFIER OF "WORK1" IS SET TO THE NODE
"COORDINATE SYSTEM [WORKPIECE 1]"
G54.9 P<WORK1>;   // THE NODE "COORDINATE SYSTEM [WORKPIECE 1]" IS SPECIFIED BY ANOTHER IDENTIFIER OF
"WORK1" AS THE COORDINATE SYSTEM

G54.7 P<COORDINATE SYSTEM [C1]> X_Y_Z_;  // THE COORDINATE SYSTEM CROSS-OFFSET OF A NODE
"COORDINATE SYSTEM [C1]" IS SET
G54.6 P<COORDINATE SYSTEM [C1]> I_J_K_;  // THE COORDINATE SYSTEM POSTURE MATRIX OF THE NODE
"COORDINATE SYSTEM [C1]" IS SET BY ROLL/PITCH/YAW
G54.9 P<COORDINATE SYSTEM [C1]>;    // THE NODE "COORDINATE SYSTEM [C1]" IS SPECIFIED AS THE COORDINATE
SYSTEM, AND THE CROSS-OFFSET AND THE POSTURE MATRIX DESCRIBED ABOVE ARE ADDED

===== SPECIFY CONTROL POINT =====
G54.9 <CONTROL POINT [TOOL 1]>;   // A NODE "CONTROL POINT [TOOL 1]" IS SPECIFIED AS THE CONTROL POINT
G54.8 P<CONTROL POINT [TOOL 1]> <TOOL1>;   // ANOTHER IDENTIFIER OF "TOOL1" IS SET TO THE NODE
"CONTROL POINT [TOOL 1]"
G54.9 P<TOOL1>;   // THE NODE "CONTROL POINT [TOOL 1]" IS SPECIFIED BY ANOTHER IDENTIFIER OF "TOOL1" AS
THE CONTROL POINT

G54.7 P<CONTROL POINT [B1]> X_Y_Z_;  // THE CONTROL POINT CROSS-OFFSET OF A NODE "CONTROL POINT [B1]" IS SET
G54.6 P<CONTROL POINT [B1]> I_J_K_;  // THE CONTROL POINT POSTURE MATRIX OF THE NODE
"CONTROL POINT NODE [B1]" IS SET BY ROLL/PITCH/YAW
G54.9 P<CONTROL POINT [B1]>;    // THE NODE "CONTROL POINT [B1]" IS SPECIFIED AS THE CONTROL POINT,
AND THE CROSS-OFFSET AND THE POSTURE MATRIX DESCRIBED ABOVE ARE ADDED
```

FIG. 28

```
COORDINATE SYSTEM
G254.9 P<WORKPIECE> Q<C1> 0;
G154.9 P<WORKPIECE> Q<C1> 0;
G54.9 P<WORKPIECE>;
```

NUMERICAL CONTROLLER AND DATA STRUCTURE

This application is based on and claims the benefit of priority from Japanese Patent Application No. 2016-240446, filed on 12 Dec. 2016, Japanese Patent Application No. 2017-195303, filed on 5 Oct. 2017, and Japanese Patent Application No. 2017-233786, filed on 5 Dec. 2017 and the content of which are incorporated herein by reference.

BACKGROUND OF THE INVENTION

Field of the Invention

The present invention relates to a numerical controller which expresses the machine configuration of a control target in a graph form and which holds it and a data structure of the graph form.

Related Art

Normally, in a controller which controls a machine tool or a robot, a control point which is included in the machine tool or the robot and which is a control target is controlled by use of a command value on a program. For example, in a machine tool, a tool root position is normally used as a control point. On the other hand, when a tool length offset function is used or when tool tip point control is performed, a tool tip position is used as a control point. Then control is performed such that these control points are moved to coordinate values specified by command values.

Patent Document 1: Japanese Unexamined Patent Application, Publication Nb. 2003-195917

SUMMARY OF THE INVENTION

There is a case where in a machine configuration having redundant flexibility, for example, in order to avoid interference, with the position and the posture of a tool tip or a tool root are being held or without the position and the posture being held, it is desired to move, as a control point, a point other than the tool tip and the tool root. For example, there is a case where as shown in FIGS. 1A and 1B, a node 501, a node 502, a node 503 and a node 504 are coupled in this order so as to configure a machine 500 which is driven by rotary axes and whose control target is desired to be a node other than the end point of the machine 500, for example, the node 503.

However, at present, a node other than the tool tip and the tool root such as the node 503 cannot be used as a control point. Although in such a case, a command is directly issued to each rotary axis, it is difficult to determine the command value of each axis such that a desired control point comes to a desired position. Specifically, even when as shown in FIG. 1A, both the X coordinate and the Z coordinate of the tool tip are held in order to avoid interference, it is difficult to move the node 503 in a desired operation direction. Even when as shown in FIG. 1B, either of the X coordinate and the Z coordinate of the tool tip is held in order to avoid interference, it is difficult to calculate a command value.

In a machine tool or a robot, a control point position is commanded on a program, the coordinate system or a command value is specified and thus a numerical controller can move the specified control point to a desired command position on the specified coordinate system. For example, in 3-axes machining, a machine coordinate system on a machine zero point or a workpiece coordinate system on a table is often specified as a coordinate system. In simultaneous 4-axes machining or simultaneous 5-axes machining, as shown in FIG. 2A, a workpiece coordinate system which is rotated to follow rotary axes is often specified as a coordinate system.

On a machine, coordinate systems other than these can be considered. For example, a "coordinate system (coordinate system which ignores only the rotation of a C axis) which is rotated to follow a B axis but is not rotated to follow the C axis and which adds the offsets of the B axis and the C axis" that is different from the coordinate system shown in FIG. 2A and that is shown in FIG. 2B can be considered. This coordinate system is particularly useful for turning which is performed while the C axis is being rotated at a constant speed because a command is easily produced and is easy to understand.

However, in general, in a numerical controller, on a series of axes which a workpiece is rotated to follow, coordinate system can be set at the end thereof but coordinate system cannot be set partway through it. When it is desired to set a coordinate system partway through it, since it is necessary to set a machine configuration again so as to form the end partway through it, it takes much time to do so.

In this point, Patent Document 1 discloses a technology related to a numerical controller whose tool length is easily changed in a machine tool laving a table rotary axis. However, although the technology of Patent Document 1 defines a coordinate system on a table it does not define a coordinate system under the table. Moreover, a control target is limited to a tool tip point.

Hence, the present invention has an object to provide a numerical controller which can freely and easily specify, as a control point, various positions on a machine configuration and which can easily set coordinate systems in various places on the machine configuration and a data structure in a graph form which expresses the machine configuration of the control target thereof.

(1) A numerical controller (for example, a numerical controller 100 which will be described later) according to the present invention expresses the machine configuration of a control target in a graph form where constituent elements are nodes and holds the machine configuration. The numerical controller includes: a control point coordinate system specification portion (for example, a control point coordinate system specification portion 114 which will be described later) that specifies, with an identifier, one or more groups of a control point and a coordinate system; a command value determination portion (for example, a command value determination portion 115 which will be described later) that uses the control point and the coordinate system specified by the control point coordinate system specification portion so as to determine for which control point and on which coordinate system one or more command values commanded in a program correspond to a coordinate value; and a movement command portion (for example, a movement command portion 116 which will be described later) that commands a move of the control point such that the coordinate value of the control point is the command value.

(2) The numerical controller described in (1) may include: a control point coordinate system insertion portion (for example, a control point coordinate system insertion portion which will be described later) that inserts the control point and the coordinate system into the graph of the machine configuration; and an identifier allocation portion (for example, an identifier allocation portion 113 which will be described later) that allocates the identifier to the control point and the coordinate system inserted.

(3) In the numerical controller described in (2), the control point coordinate system insertion portion (for example, the control point coordinate system insertion portion 112 which will be described later) may insert, as a node, the control point and the coordinate system into each of the nodes in the graph of the machine configuration.

(4) In the numerical controller described in (2), the control point coordinate system insertion portion (for example, the control point coordinate system insertion portion 112 which will be described later) may make each of the nodes in the graph of the machine configuration have the control point and the coordinate system as information.

(5) In the numerical controller described in (1) to (4), the graph or the machine configuration may include, as the constituent element, a unit in which a plurality of axes are integrated into one.

(6) In the numerical controller described in (5), a script described by a user may be analyzed so as to define the unit, and the defined unit may be included as the constituent element in the graph of the machine configuration.

(7) In the numerical controller described in (1) to (6), the coordinate system may be able to be prevented from being affected by a specific node.

(8) In the numerical controller described in (1) to (7), the control point may be able to be prevented from being affected by a specific node.

(9) In the numerical controller described in (1) to (8), an arbitrary address which is allocated to an identifier previously defined for each meaning may be used as the command value regardless of an axis name included in the graph of the machine configuration.

(10) In the numerical controller described in (9), the meaning may include the position of the control point, the posture of the control point and the angle position of rotary axis for determining the posture.

(11) In the numerical controller described in (1) to (10), the coordinate value of a specific node may be able to be directly specified as the command value.

(12) In the numerical controller described in (1) to (11), the movement command portion (for example, a movement command portion 116 which will be described later) may include: a simultaneous equation generation portion (for example, simultaneous equation generation portion 161 which will be described later) that generates a hypercomplex multidimensional simultaneous equation which determines a first coordinate transformation formula of the command value from the specified coordinate system and the graph of the machine configuration, which determines a second coordinate transformation formula of the control point from the specified control point and the graph of the machine configuration and which defines that the first coordinate transformation formula is equal to the second coordinate transformation formula; a simultaneous equation solving portion (for example, a simultaneous equation solving portion 162 which will be described later) that determines a solution of the hypercomplex multidimensional simultaneous equation; and a movement pulse generation portion (for example, a movement pulse generation portion 163 which will be described later) that uses the solution generated by the simultaneous equation solving portion so as to generate a movement pulse used for movement command 13) In the numerical controller described in (12), the simultaneous equation generation portion (for example, the simultaneous equation generation portion 161 which will be described later) may directly specify the coordinate value of a specific node so as to reduce the number of simultaneous equations.

(14) A data structure according to the present invention expresses the machine configuration of a control target of a numerical controller (for example, the numerical controller 100 which will be described later) and is in a graph form where constituent elements are nodes. A control point and a coordinate system are inserted as a node into a graph of the machine configuration, and an identifier is allocated to each of the control point and the coordinate system.

According to the present invention, it is possible to freely and easily specify, as a control point, various positions on a machine configuration, and it is also possible to easily set coordinate systems in various places on the machine configuration.

BRIEF DESCRIPTION OF THE DRAWINGS

FIG. 2A is a diagram showing an example of the axes of a normal table used in turning or the like;

FIG. 2B is a diagram showing an example of the axes of the normal table used in turning or the like;

FIG. 9 is a diagram showing a generation operation of the machine configuration tree generated in the embodiment of the present invention;

FIG. 10A is a diagram showing an example of a parent-child relationship of the machine configuration according to the embodiment of the present invention;

FIG. 10B is a diagram showing an example of the parent-child relationship of the machine configuration according to the embodiment of the present invention;

FIG. 12 is a diagram showing an example of the machine configuration according to the embodiment of the present Invention;

FIG. 16 is a diagram showing an example of a command issued by the numerical controller according to the embodiment of the present invention;

FIG. 26 is a diagram showing an example of a program in the embodiment of the present invention;

FIG. 27 is a diagram showing an example of the program in the embodiment of the present invention;

FIG. 28 is a diagram showing an example of the program in the embodiment of the present invention;

FIG. 30 is a diagram showing an example of the program in the embodiment of the present invention;

FIG. 31 is diagram showing an example of the program in the embodiment of the present invention;

FIG. 35 is a diagram showing an example of the program in the embodiment of the present invention;

DETAILED DESCRIPTION OF THE INVENTION

An embodiment of the present invention will be described in detail below with reference to FIGS. 3 to 33. The configuration of a numerical controller according to the embodiment of the present invention will first be described.

[1. Configuration of Invention]

Figure 1A:
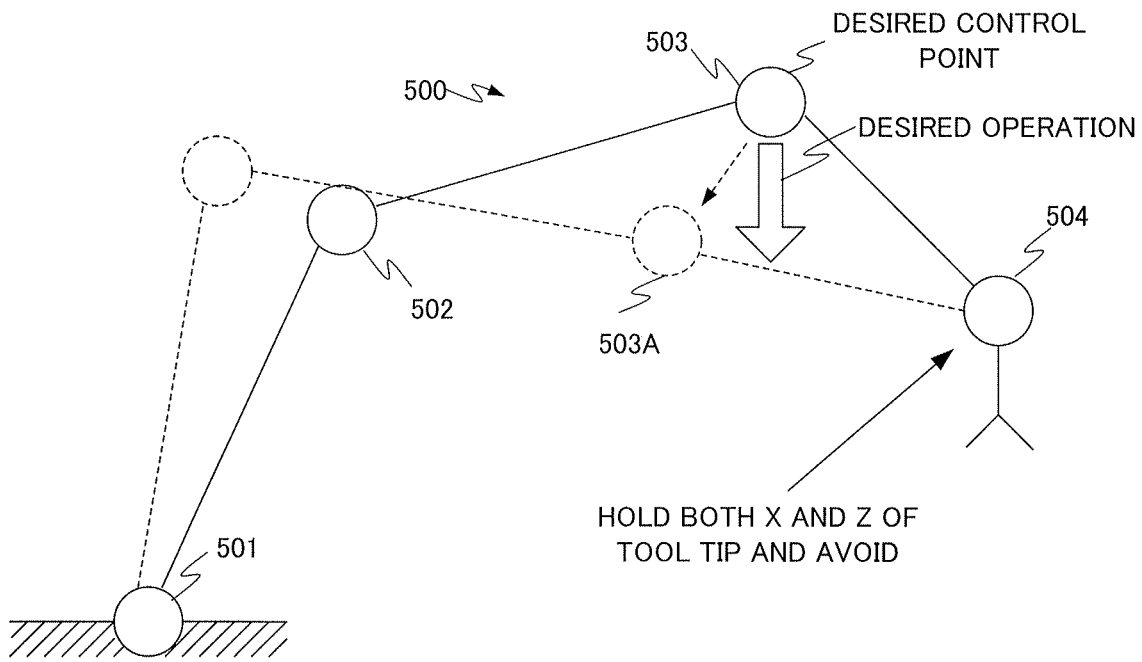
FIG. 1A is a diagram showing a desired operation of a desired control point in a conventional machine configuration.
Figure 1B:
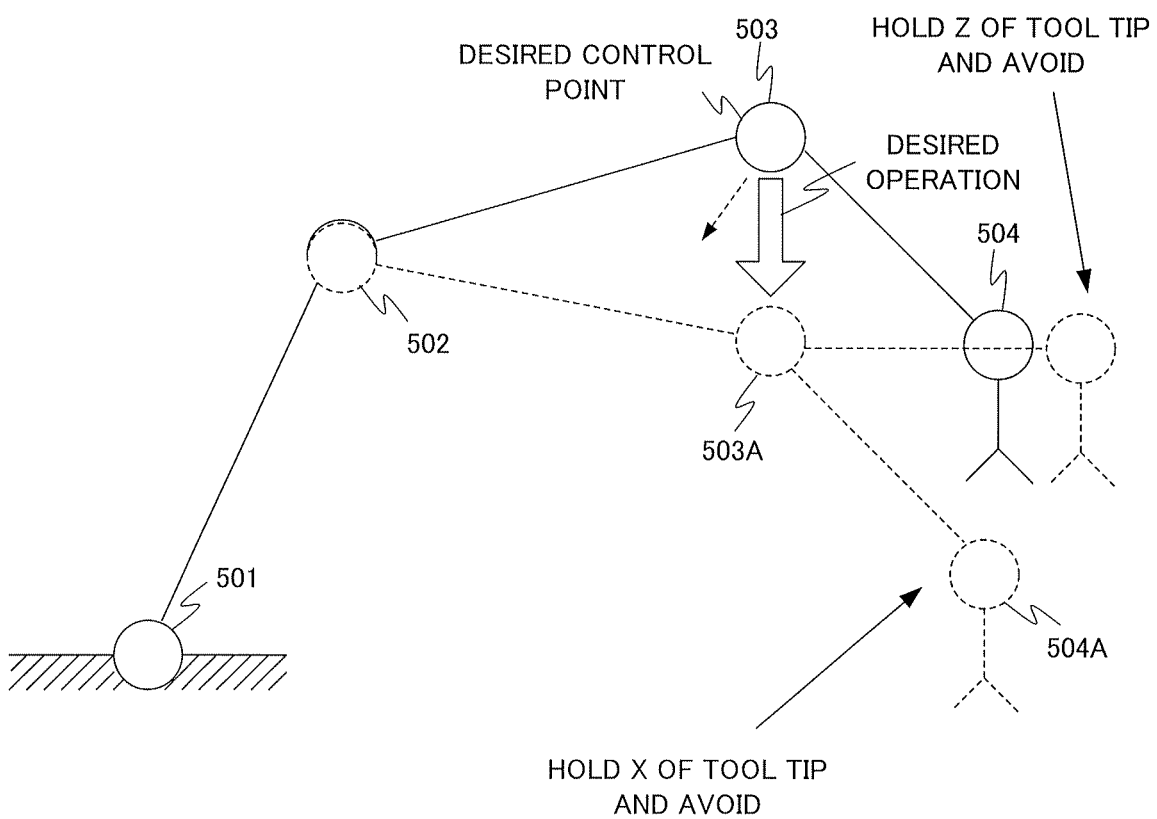
FIG. 1B is a diagram showing the desired operation of the desired control point in the conventional machine configuration.
Figure 2A:
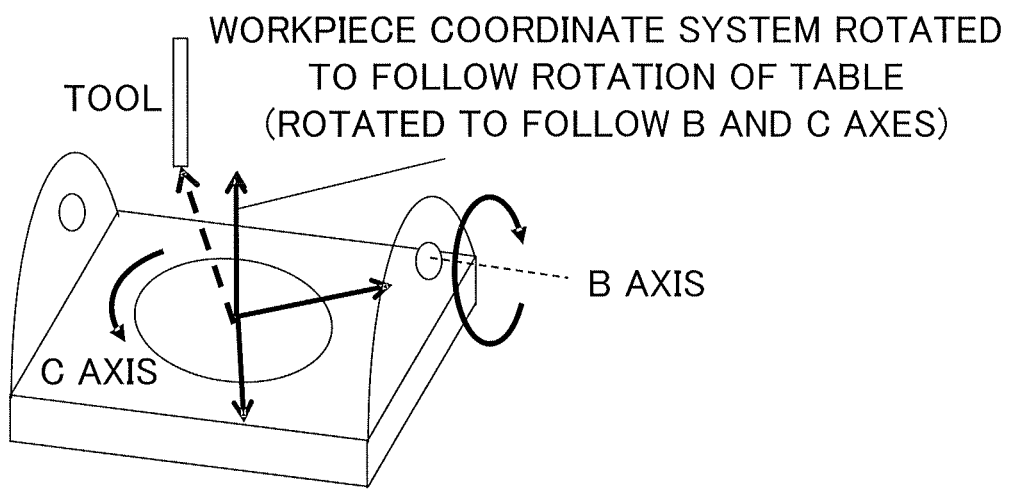
Figure 2B:
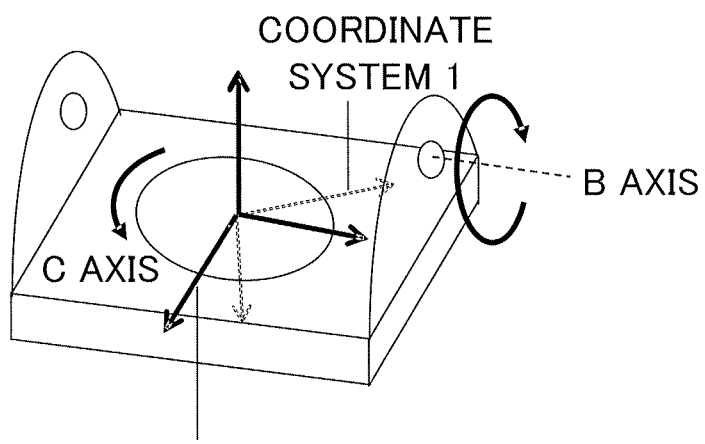
Figure 3:
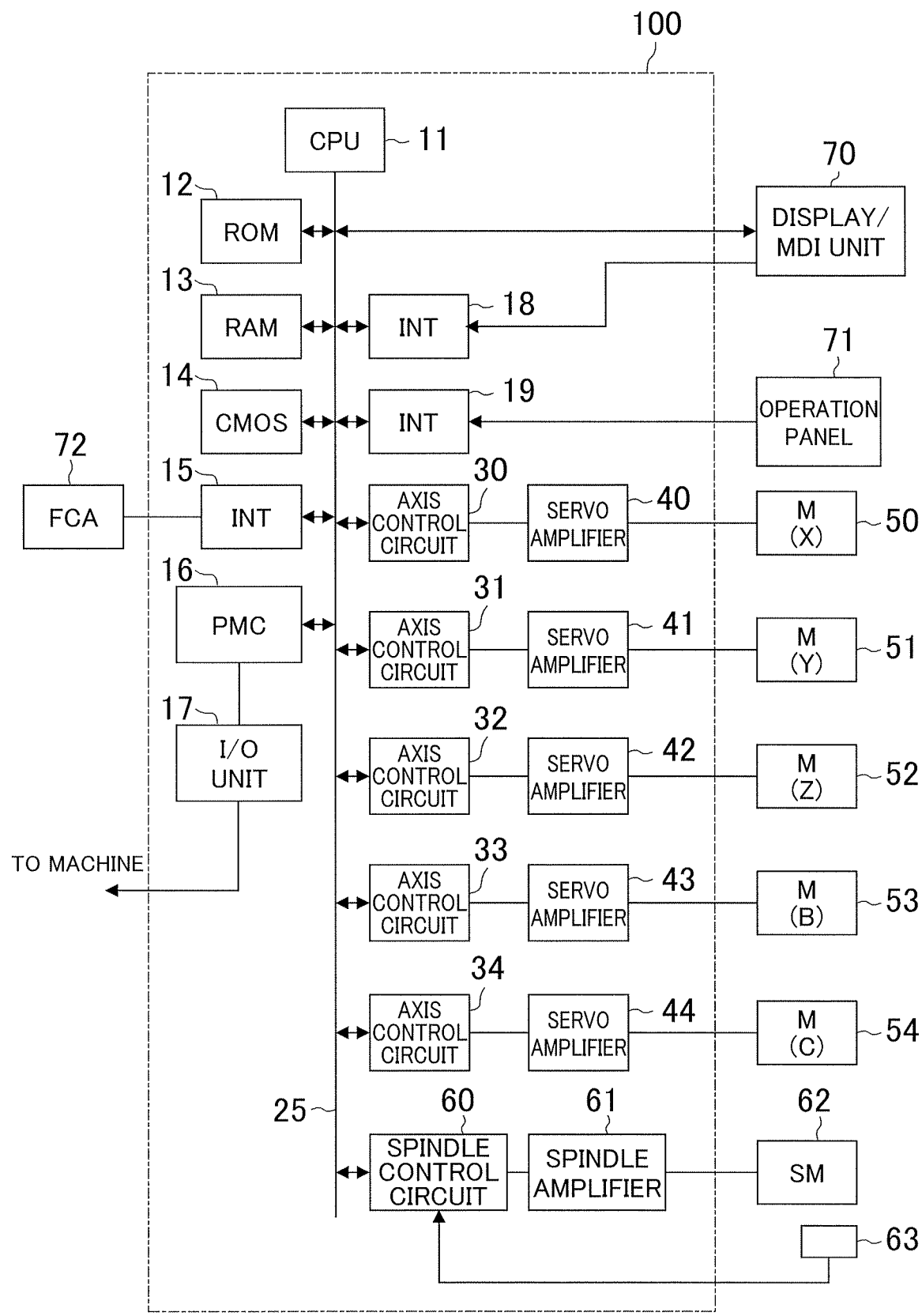
FIG. 3 is a diagram showing the configuration of a numerical controller according to an embodiment of the present invention.

FIG. 3 shows an example of the configuration of the numerical controller 100 according to the embodiment of the present invention. The numerical controller 100 mainly includes a CPU 11, a ROM 12, a RAM 13, a CMOS 14, interfaces 15, 18 and 19, a PMC (Programmable Machine Controller) 16, an I/O unit 17, axis control circuits 30 to 34, servo amplifiers 40 to 44, a spindle control circuit 60 and a spindle amplifier 61.

The CPU 11 is a processor which performs overall control on the numerical controller 100. The CPU 11 reads, through a bus 20, a system program stored in the ROM 12 so as to control the entire numerical controller 100 according to the system program.

In the RPM 13, temporary calculation data and display data and various types of data which are input by an operator through a display/MDI unit 70 are stored.

The CMOS memory 14 is configured as a non-volatile memory which is backed up by an unillustrated battery and in which even when the power supply of the numerical controller 100 is turned off, its memory state is held. In the CMOS memory 14, machining program which is read through the interface 15, a machining program which is input through the display/MDI unit 70 and the like are stored.

In the ROM 12, various types of system programs for performing processing on an edition mode necessary for the production and edition of a machining program and processing for an automatic operation are previously written.

Various types of machining programs such as a machining program for practicing the present invention are input through the interface 15 and the display/MDI unit 70 and can be stored in the CMOS memory 14.

The interface 15 makes possible to connect to ether the numerical controller 100 and external equipment 72 such as an adaptor. From the side of the external equipment 72, a machining program, various types of parameters and the like are read. The machining program edited within the numerical controller 100 can be stored through the external equipment 72 in an external storage means.

The PMC (Programmable Machine Controller) 16 uses a sequence program incorporated in the numerical controller 100 so as to output a signal to an auxiliary device of a machine tool (for example, an actuator such as a robot hand for tool replacement) through the I/O unit 17 and thereby perform control. The PMC (Programmable Machine Controller) 16 also receives signals of various types of switches and the like in an operation panel provided in the main body of the machine tool, performs necessary signal processing and then feeds the signals to the CPU 11.

The display/MDI unit 70 is a manual data input device which includes a display, a keyboard and the like. The interface 18 receives a command or data from the keyboard of the display/MDI unit 70 and feeds it to the CPU 11. The interface 19 is connected to an operation panel 71 which includes a manual pulse generator and the like.

The axis control circuits 30 to 34 of the individual axes receive, from the CPU 11, the movement command amounts of the individual axes, and output the commands of the individual axes to the servo amplifiers 40 to 44.

The servo amplifiers 40 to 44 receive the commands so as to hive the servo motors 50 to 54 of the individual axes. The servo motors 50 to 54 of the individual axes incorporate position/speed detectors, feed back position/speed feedback signals from the position/speed detectors to the axis control circuits 30 to 34 and thereby perform feedback control on the position and the speed. In the block diagram, the position speed feedback is omitted.

The spindle control circuit 60 receives a main axis rotation command to the machine tool so as to output a spindle speed signal to the spindle amplifier 61. The spindle amplifier 61 receives the spindle speed signal so as to rotate the spindle motor 62 of the machine tool at a commanded rotation speed and thereby drives a tool.

A pulse encoder 63 is coupled to the spindle motor 62 with a gear, a belt or the like. The pulse encoder 63 outputs a return pulse in synchronization with the rotation of the main axis. The return pulse is read via the bus 20 by the CPU 11.

In the example of the configuration of the numerical controller 100 shown in FIG. 3, the five axis control circuits 30 to 34 and the five servo motors 50 to 54 are shown. However, the present invention is not limited to this configuration, and arbitrary numbers of axis control circuits and servo motors can be provided.

Figure 4:
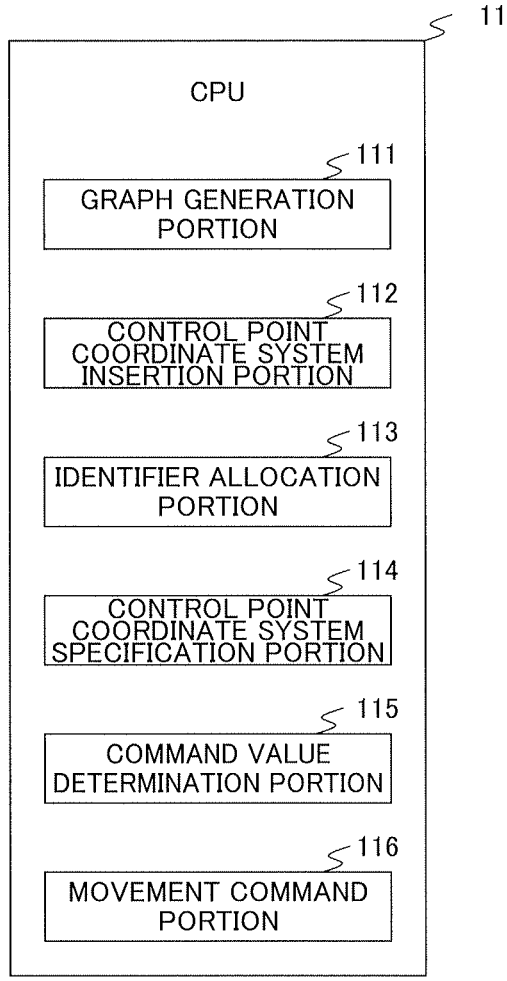
FIG. 4 is a block diagram showing the function of a CPU in the numerical controller according to the embodiment of the present invention.

FIG. 4 is a functional block diagram showing a function which the CPU 11 reads, through the bus 20, the system program and an application program stored in the ROM 12 so as to realize according to the system program and the application program. The CPU 11 includes a graph generation portion 111, a control point coordinate system insertion portion 112, an identifier allocation portion 113, a control point coordinate system specification portion 114, a command value determination portion 115 and a movement command portion 116.

The graph generation portion 111 generates the machine configuration of a control target in a graph form. The detailed operation thereof will be described in detail in "2. Generation of machine configuration tree" below.

The control point coordinate system insertion portion 112 inserts a control point and a coordinate system into the graph of the machine configuration. The identifier allocation portion 113 allocates an identifier to each of the control point and the coordinate system. The detailed operations of the control point coordinate system insertion portion 112 and the identifier allocation portion 113 will be described in detail in "3. Abstraction of command address" to "8. Derivation of coordinate system from machine configuration tree" below.

The control point coordinate system specification portion 114 specifies, with the identifiers, the control point and the coordinate system. Specifically, the control point coordinate system specification portion 114 uses, for example, any one or a command in a program, a parameter setting, a screen operation and an input value from an input means to the numerical controller 100 so as to specify the control point and the coordinate system. The command value determination portion 115 determines for which control point and on which coordinate system the command value in the program is a coordinate value. The detailed operations of the control point coordinate system specification portion 114 and the command value determination portion 115 will described in detail in "3. Abstraction or command address" to "8. Derivation of coordinate system from machine configuration tree" below.

The movement command portion 116 issues a command for the move of the control point such that the coordinate value of the control point is the command value in the program. The detailed operation of the movement command portion 116 will be described in detail "9. Movement pulse generation method" below. An example of the configuration of the movement command portion 116 will be shown in FIG. 5.

Figure 5:
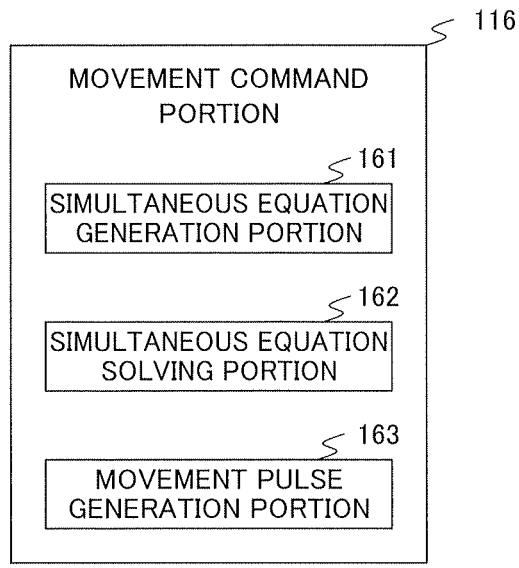
FIG. 5 is a block diagram showing the function of a CPU in a movement control portion according to the embodiment of the present invention.

As shown in FIG. 5, the movement command portion 116 Includes a simultaneous equation generation portion 161, simultaneous equation solving portion 162 and a movement pulse generation portion 163.

The simultaneous equation generation portion 161 uses the method described in "9. Movement pulse generation method" below so as to determine a first coordinate transformation formula of the coordinate value from the coordinate system and the graph of the machine configuration specified, to determine a second coordinate transformation formula of the control point from the control point and the graph of the machine configuration specified and to generate a hypercomplex multidimensional simultaneous equation for defining that the first coordinate transformation formula is equal to the second coordinate transformation formula.

The simultaneous equation solving portion 162 determines the solution of the hypercomplex multidimensional simultaneous equation. The movement pulse generation portion 163 uses the solution generated by the simultaneous equation solving portion 162 so as to generate a movement pulse used in a movement command

[2. Generation of Machine Configuration Tree]

The numerical controller 100 according to the embodiment of the present invention first generates the graph showing the machine configuration. A method of generating a machine configuration tree as an example of the graph will be described in detail with reference to FIGS. 6 to 9.

Figure 6:
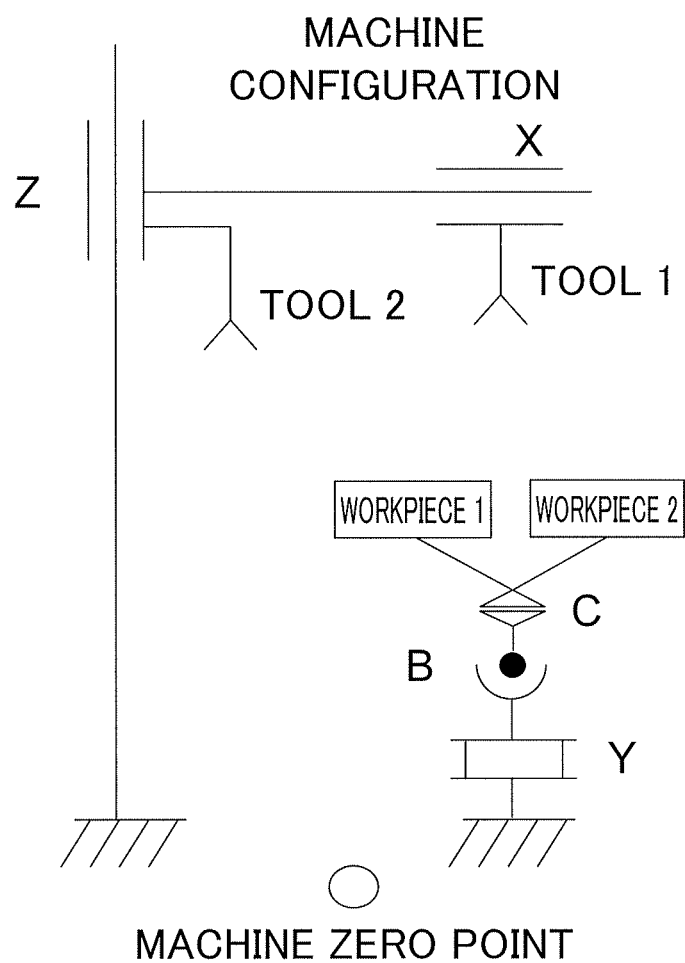
FIG. 6 is a diagram showing an example of a machine which is a target for the generation of a machine configuration tree according to the embodiment of the present invention.

As the example, the method of generating the machine configuration tree expressing the configuration of a machine shown in FIG. 6 will be described. In the machine of FIG. 6, it is assumed that an axis is set perpendicular to a Z axis, that a tool 1 is installed in the X axis and that a tool 2 is installed in the Z axis. On the other hand, it is assumed that a B axis is set on a Y axis, that a C axis is set on the B axis and that a workpiece 1 and a workpiece 2 are installed in the C axis. The method of expressing the machine configuration as the machine configuration tree will be described below.

Figure 7:
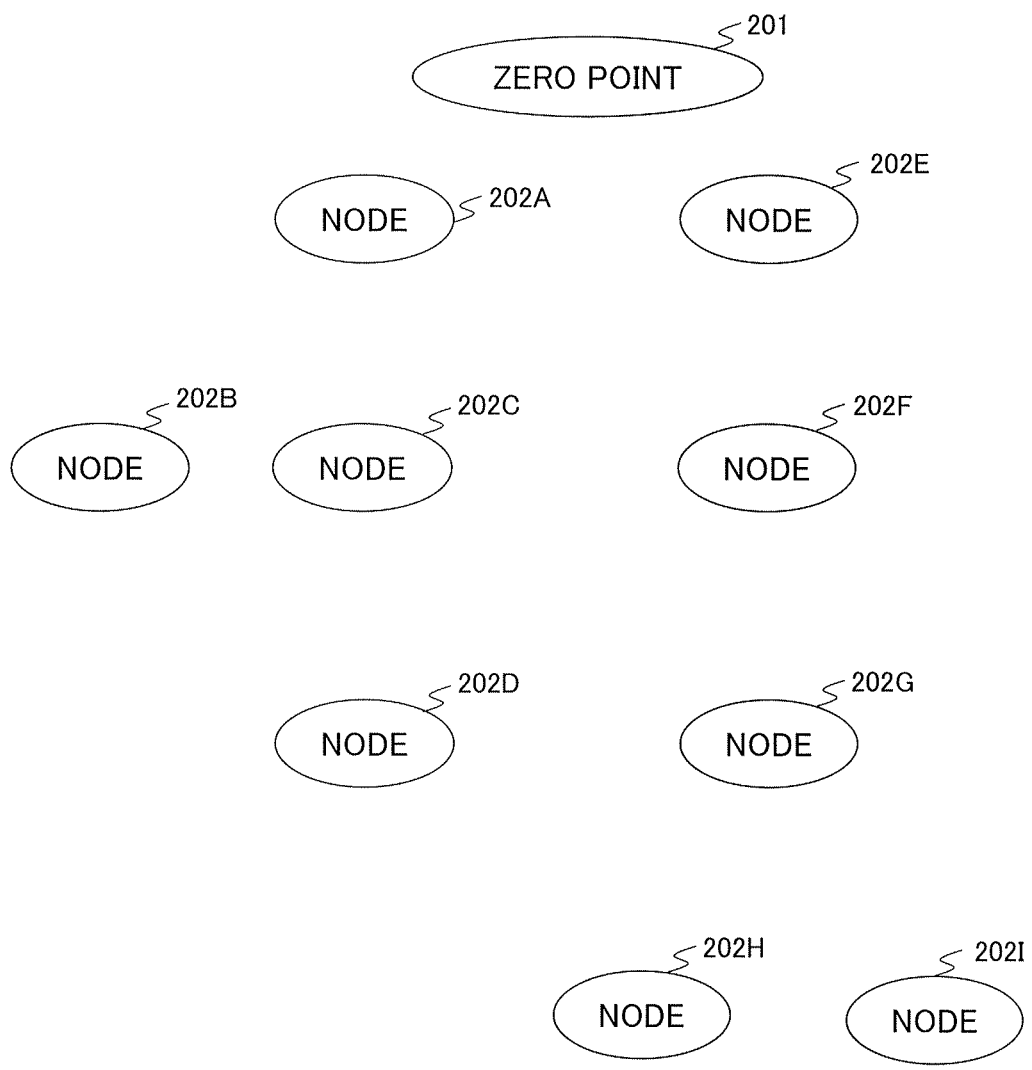
FIG. 7 is a diagram showing a method of generating the machine configuration tree according to the embodiment of the present invention.
Figure 8:
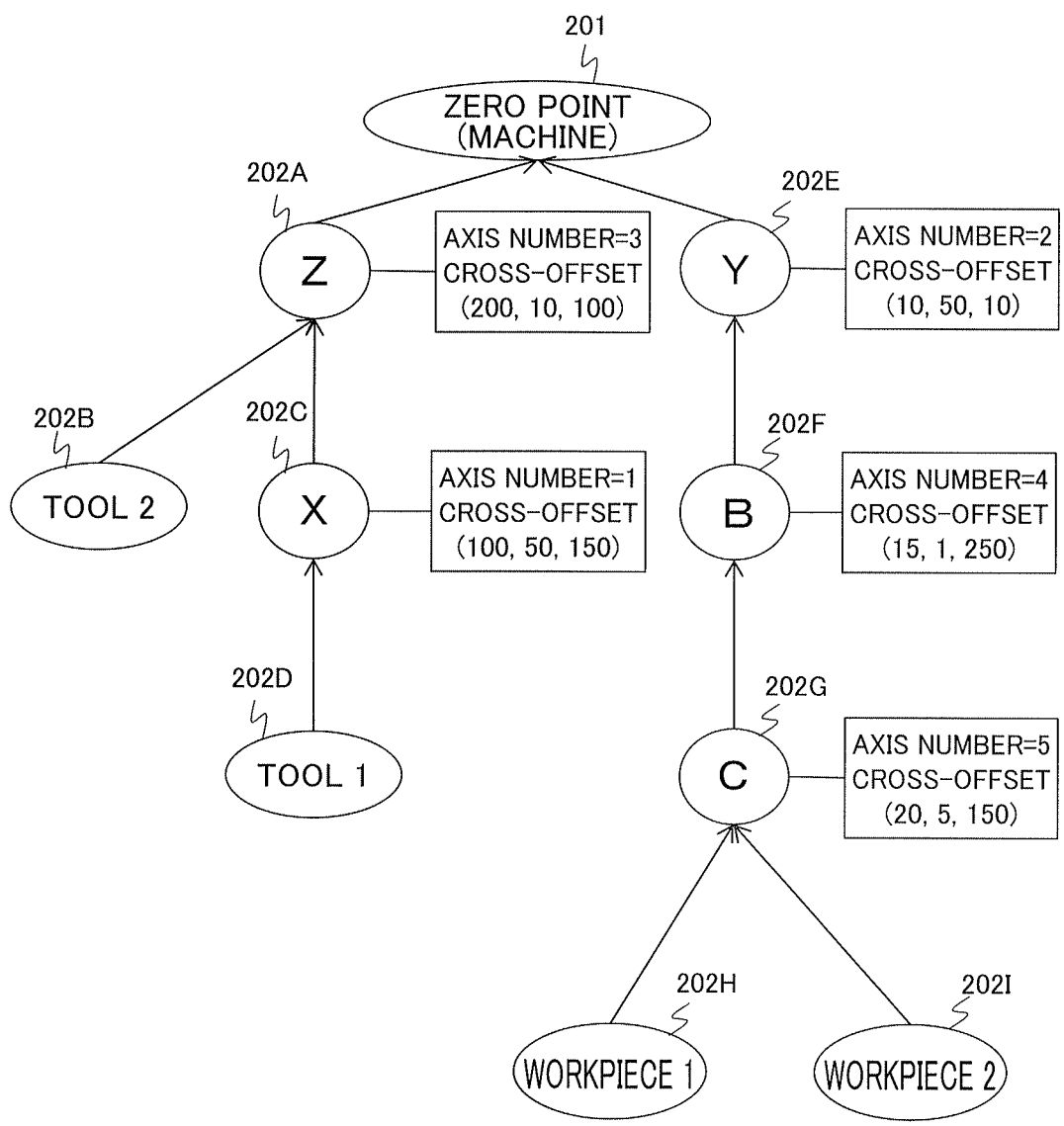
FIG. 8 is a diagram showing the method of generating the machine configuration tree according to the embodiment of the present invention.

First, as shown in FIG. 7, only a zero point 201 and nodes 202A to 202E are arranged. In this stage, there is no connection between the zero point 201 and the node 202 and between the nodes 202, and the names of the zero point and the nodes are not set.

Then, the axis names (axis types) of the individual axes, the names of the individual tools, the names of the individual workpieces, the names of the individual zero points and the physical axis numbers (axis types) of the in axes are set. Then, the parent nodes (axis types) of the individual axes, the parent nodes of the individual tools and the parent nodes of the individual workpieces are set. Finally, the cross-offsets (axis types) of the individual axes, the cross-offsets of the individual tools and the cross-offsets of the individual workpieces are set. Consequently, the machine configuration tree shown in FIG. 8 generated.

Each node of the machine configuration tree is not limited to the pieces of information described above, and it may or may not have information related to, for example, the identifier (name), the identifier of the parent node of itself, the identifiers of all child nodes whose parents are itself, an relative offset (cross-offset) with respect to the parent node, a relative coordinate value with respect to the parent node, a relative movement direction (unit vector) with respect to the parent node, node types (linear axis/rotary axis/unit (which will be described later)/control point/coordinate system/zero point and the like) the physical axis number and the transformation formulas of an orthogonal coordinate system and a physical coordinate system.

Each node of the machine configuration tree may or may not have information necessary for the node itself being the control point or the coordinate system. The information necessary the node itself being the control point or the coordinate system is information as to whether or not, for example, an offset, a posture matrix, a move and an offset are considered though the details thereof will be described later, and they may be included or may not be included. Here, depending on whether or not each node has the information necessary for the node itself being the control point or the coordinate system, the embodiment of the control point coordinate system specification portion which will be described later differs. When each node does not have the necessary information, the necessary information can also be provided to the node by the control point coordinate system insertion portion and a control point coordinate system identifier allocation portion which will be described later.

As described above, values are set to the individual nodes, and thus data which has a data structure in the shape of a machine configuration tree is generated within the numerical controller 100. Furthermore, even when another machine (or robot) is added, a zero point is added, and thus is possible to further add nodes.

A flowchart obtained by generalizing the method of generating the machine configuration tree described above, in particular, the method of setting the values to the nodes shown in FIG. 9.

In step S11, the graph generation portion 111 receives the value of a parameter set to the node. When in step S12, the item of the set parameter is "parent node of itself" (YES in S12), the processing is transferred to step S13. When the item of the set parameter is not "parent node of itself" (NO in S12), the processing is transferred to step S17.

When in step S13, a parent node has already set to the node to which the parameter is set (YES in S13), the processing is transferred to step S14. When a parent node has not been set (NO in S13), the processing is transferred to step S15.

In step S14 the graph generation portion 111 deletes the identifier of itself from the item of "child node" possessed by the current parent node of the node to which the parameter is set so as to update the machine configuration tree.

In step S15, the graph generation portion 111 sets the value to the corresponding item of the node to which the parameter is set.

In step S16, the graph generation portion 111 adds the identifier of itself to the item of "child node" in the parent node so as to update the machine configuration tree, and thereafter the flow is completed.

In step S17, the graph generation portion 111 sets the value to the corresponding item of the node to which the parameter is set, and thereafter the flow is completed.

The method of generating the data having the data structure in the shape of the machine configuration tree described above is used, and thus it, is possible to set a parent-child relationship of the constituent elements of the machine. Here, the parent-child relationship refers to a relationship in which, for example, when as shown in FIG. 10A, two rotary axis nodes 104 and 105 are present, a variation in the coordinate value of the node 104 on one side unilaterally affects the geometric state (typically, the position and the posture) of the node 105 on the other side. In this case, the nodes 104 and 105 are said to have a parent-child relationship, the node 104 is referred to as a parent and the node 105 is referred to as a child. However, for example, as shown in FIG. 10B, in a machine configuration that is configured with two linear axis nodes 102 and 103 and four free joints 101, a mechanism is present in which as the coordinate value (length) of one of the nodes 102 and 103 is varied, not only the geometric state of the other node but also the geometric state of itself is varied, that is, the nodes affect each other. In such a case, both of them are parents and children, and in other words, the parent-child relationship can be regarded as being bidirectional.

Figure 11A:
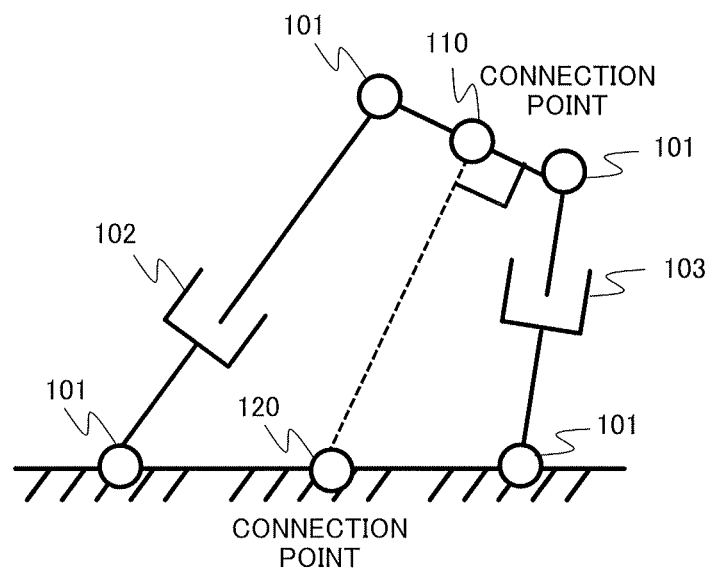
FIG. 11A is a diagram showing an example of a unit included in the machine configuration according to the embodiment of the present invention.
Figure 11B:
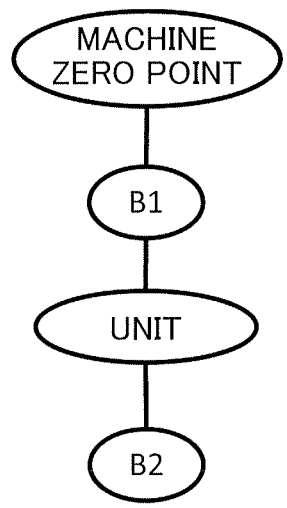
FIG. 11B is a diagram showing an example of the unit included in the machine configuration according to the embodiment of the present invention.
Figure 11C:
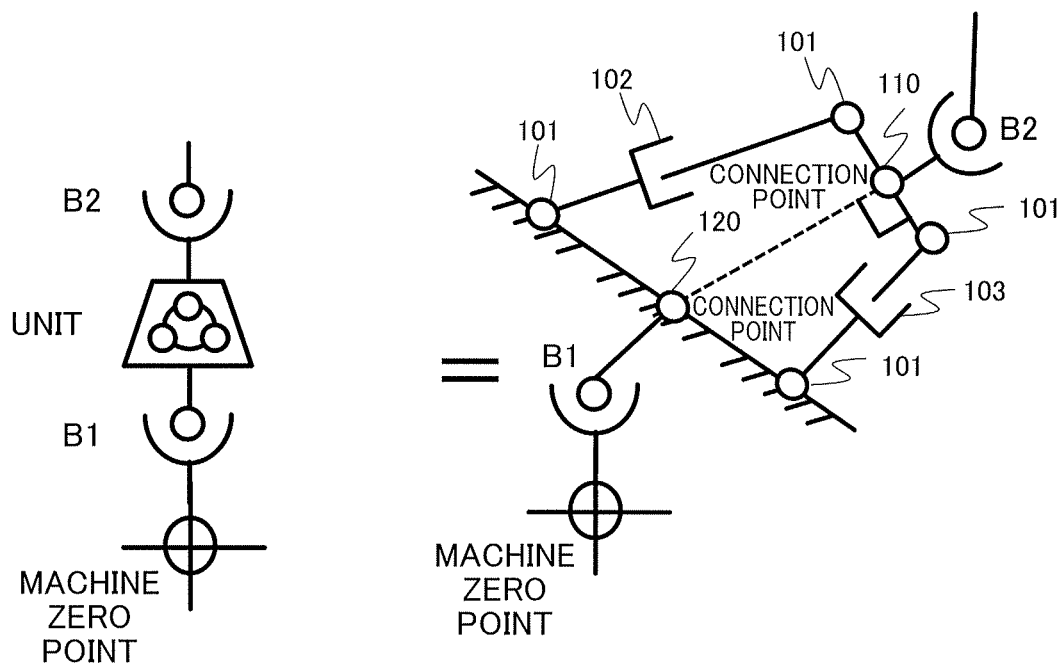
FIG. 11C is a diagram showing an example of the unit included in the machine configuration according to the embodiment of the present invention.

As described above, a mechanism in which a variation in a certain node affects the other node is regarded as one unit in terms of convenience, this unit is inserted into the machine configuration tree and thus the entire machine configuration tree is generated. As shown in FIG. 11A, the unit has two connection points 110 and 120, and when the unit is inserted into the machine configuration tree as shown in FIG. 11B, as shown in FIG. 11C, the patent node is connected to the connection point 120, and the child node is connected to the connection point 110. The unit also has a transformation matrix from the connection point 120 to the connection point 110. This transformation matrix is indicated by the coordinate values of the individual nodes included in the unit. For example, in the case of a machine configuration shown in FIG. 12, when a homogeneous matrix indicating the position and the posture of the connection point 120 is assumed to be $M_A$, and a homogeneous matrix indicating the position and the posture of the connection point 110 is assumed to be $M_B$, a transformation formula between the matrices is represented as follows by use of the coordinate values $x_1$ and $x_2$ of the linear axis nodes included in the unit.

When it is assumed [Formula 1]

$$\theta = \sin^{-1}\left(\frac{x_1^2 - x_2^2}{4L_1 L_2}\right)$$

$$L = L_1\cos\theta + \sqrt{0.5x_1^2 + 0.5x_2^2 - L_2^2 - L_1^2\sin^2\theta}$$

-continued the formula is represented $$M_B = TM_A \text{ where } T = \begin{pmatrix} \sin\theta & 0 & \cos\theta & L\cos\theta \\ 0 & 1 & 0 & 0 \\ -\cos\theta & 0 & \sin\theta & L\sin\theta \\ 0 & 0 & 0 & 1 \end{pmatrix}$$

The unit indicating this machine configuration has a homogeneous transformation matrix such as T in the mathematical formula of [Formula 1] described above. The homogeneous matrix refers to a 4×4 matrix which can collectively express the position and the posture as in the mathematical formula of [Formula 2] below.

$$\overbrace{\begin{pmatrix} \cos\theta & \sin\theta & 0 \\ \sin\theta & \cos\theta & 0 \\ 0 & 0 & 1 \\ 0 & 0 & 0 \end{pmatrix}}^{\text{posture}} \overbrace{\begin{pmatrix} x \\ y \\ z \\ 1 \end{pmatrix}}^{\text{position}} \quad \text{[Formula 2]}$$

Even when the parent-child relationship is not mutual, in order for calculation processing or a setting to be simplified, a unit which a plurality of nodes are previously integrated into one may be defined and configured into the machine configuration tree.

Figure 13A:
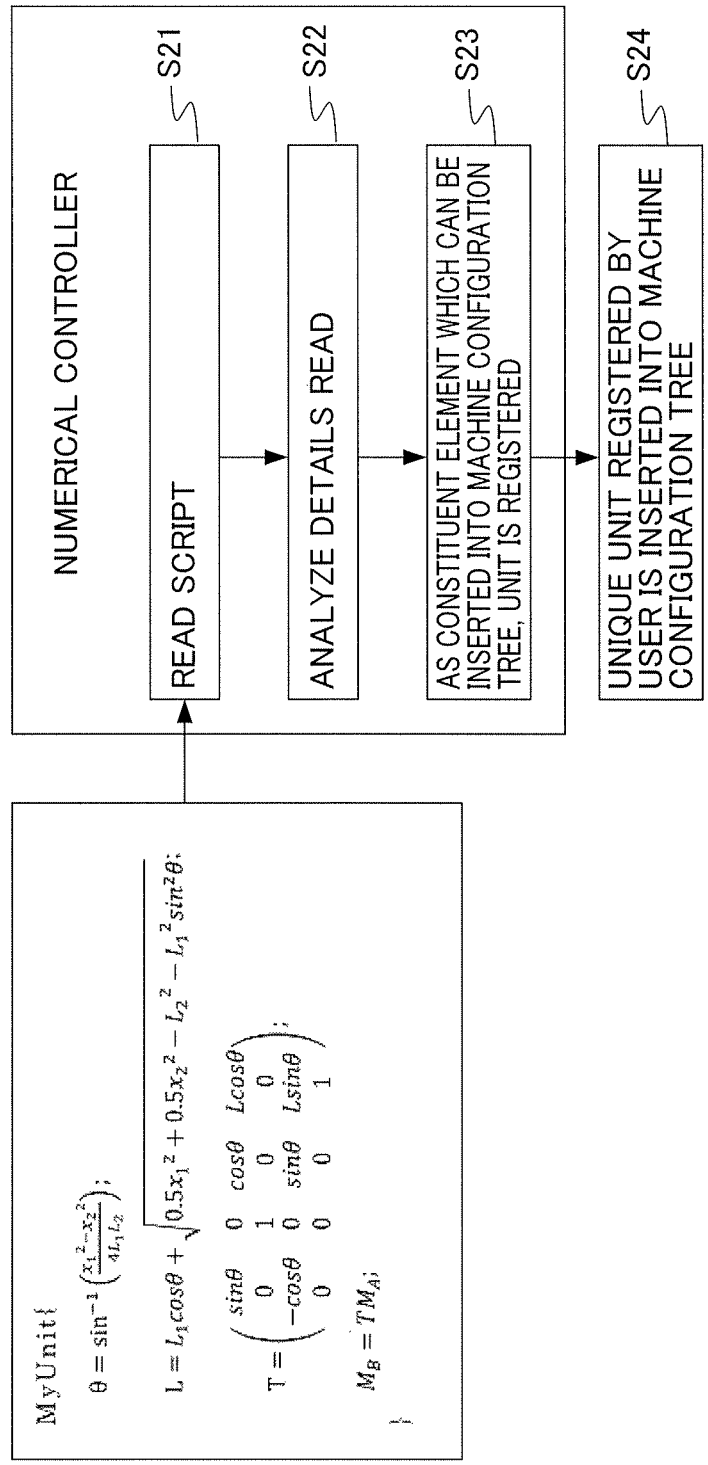
FIG. 13A is a method of defining the unit included in the machine configuration according to the embodiment of the present invention.

The unit described above may be previously defined in the numerical controller or a script which is described uniquely by a user may be read by the numerical controller. FIG. 13A shows an example of a flow when the script described uniquely by the user is read by the numerical controller. In step S21, the numerical controller 100 reads the script defined by the user. In step S22, the numerical controller 100 analyzes the details of the read script, and newly defines a unit. In step S23, the numerical controller 100 newly registers the newly defined unit as a constituent element which can be inserted into a machine configuration graph. Consequently, in step S24, the user can insert the registered unique unit (in the example of FIG. 13A, MyUnit) into the machine configuration tree.

Figure 13B:
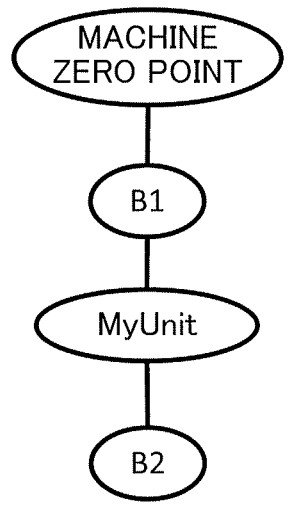
FIG. 13B is a diagram showing an example of the unit included in the machine configuration according to the embodiment of the present invention.

In other words, a configuration may be adopted in which the script uniquely described by the user is read by the numerical controller and the details thereof are analyzed such that a unit is newly defined, and in which this unit is used so as to be able to be configured into the machine configuration tree. FIG. 13B shows an example where the unique unit. MyUnit newly defined by the script described in FIG. 13A is inserted into the machine configuration tree. In this way, even when the unit of a form desired by the user is not previously defined in the numerical controller, the user can uniquely add a definition, with the result that convenience is enhanced.

As described above, in the present embodiment, the graph of the machine configuration can include, as a constituent element, a unit in which a plurality of axes is integrated into one.

Figure 14A:
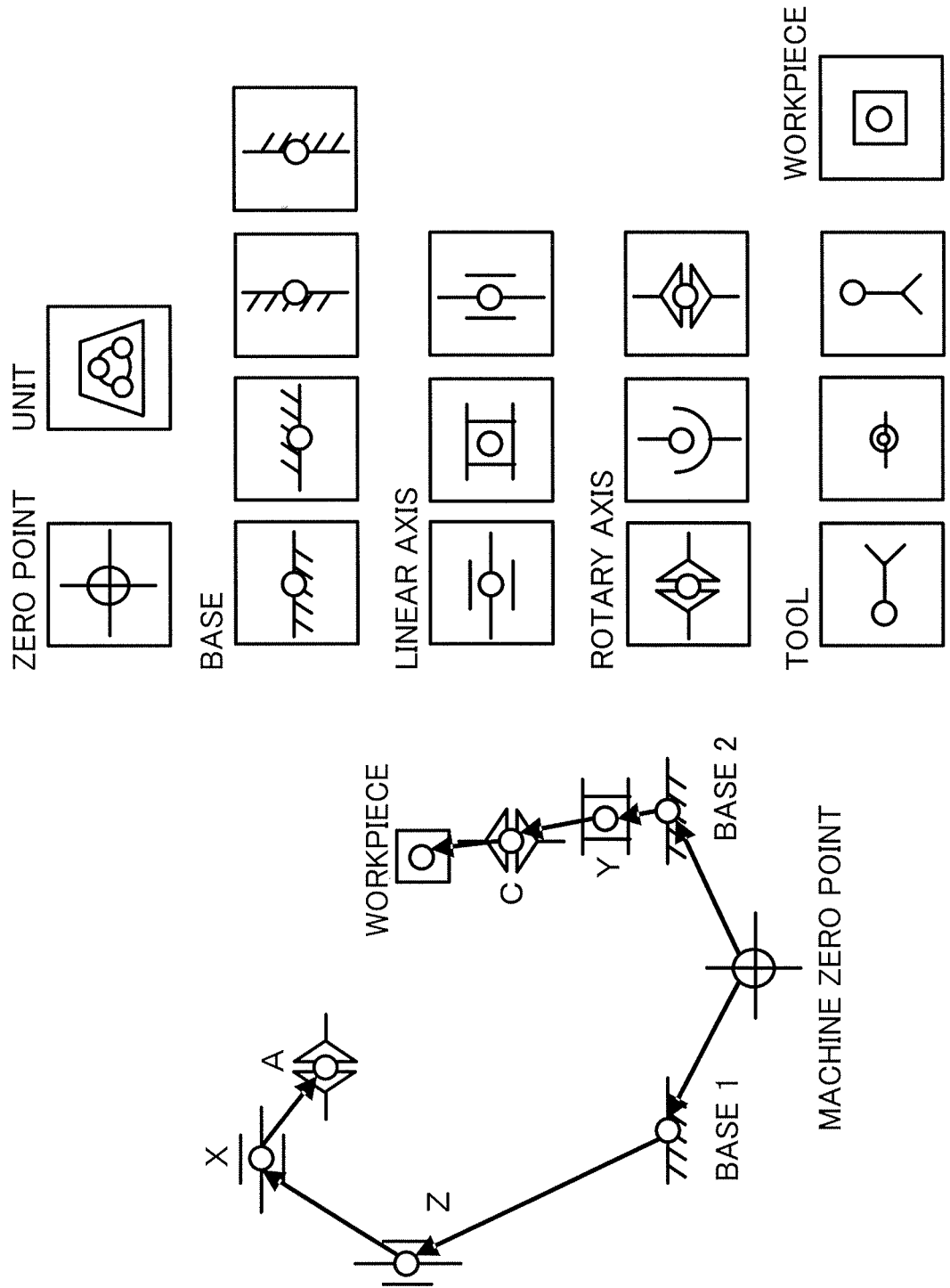
FIG. 14A is a diagram showing an example of a GUI (graphical user interface) in the embodiment of the present invention.
Figure 14B:
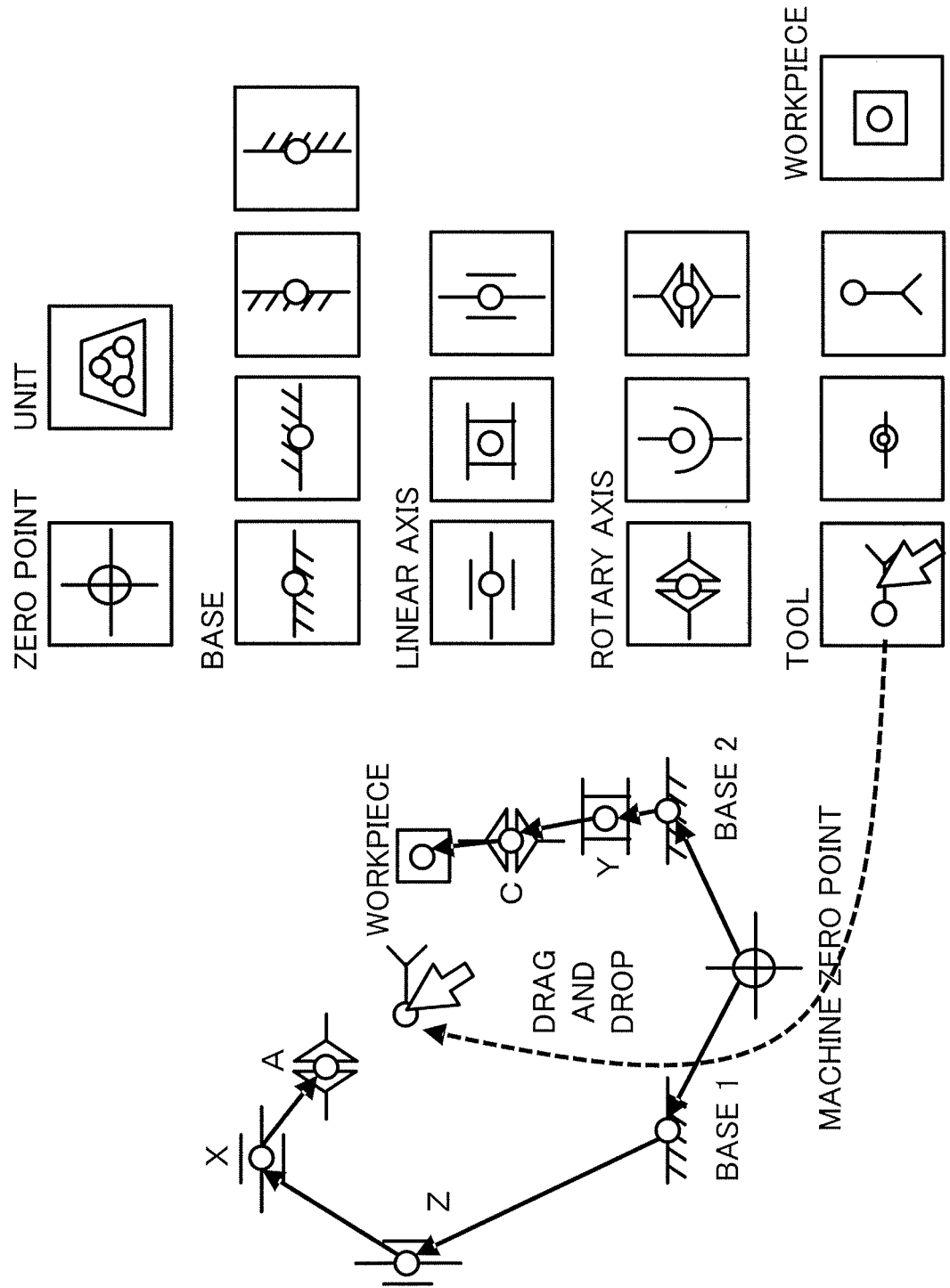
FIG. 14B is a diagram showing an example of the GUI (graphical user interface) in the embodiment of the present invention.
Figure 14C:
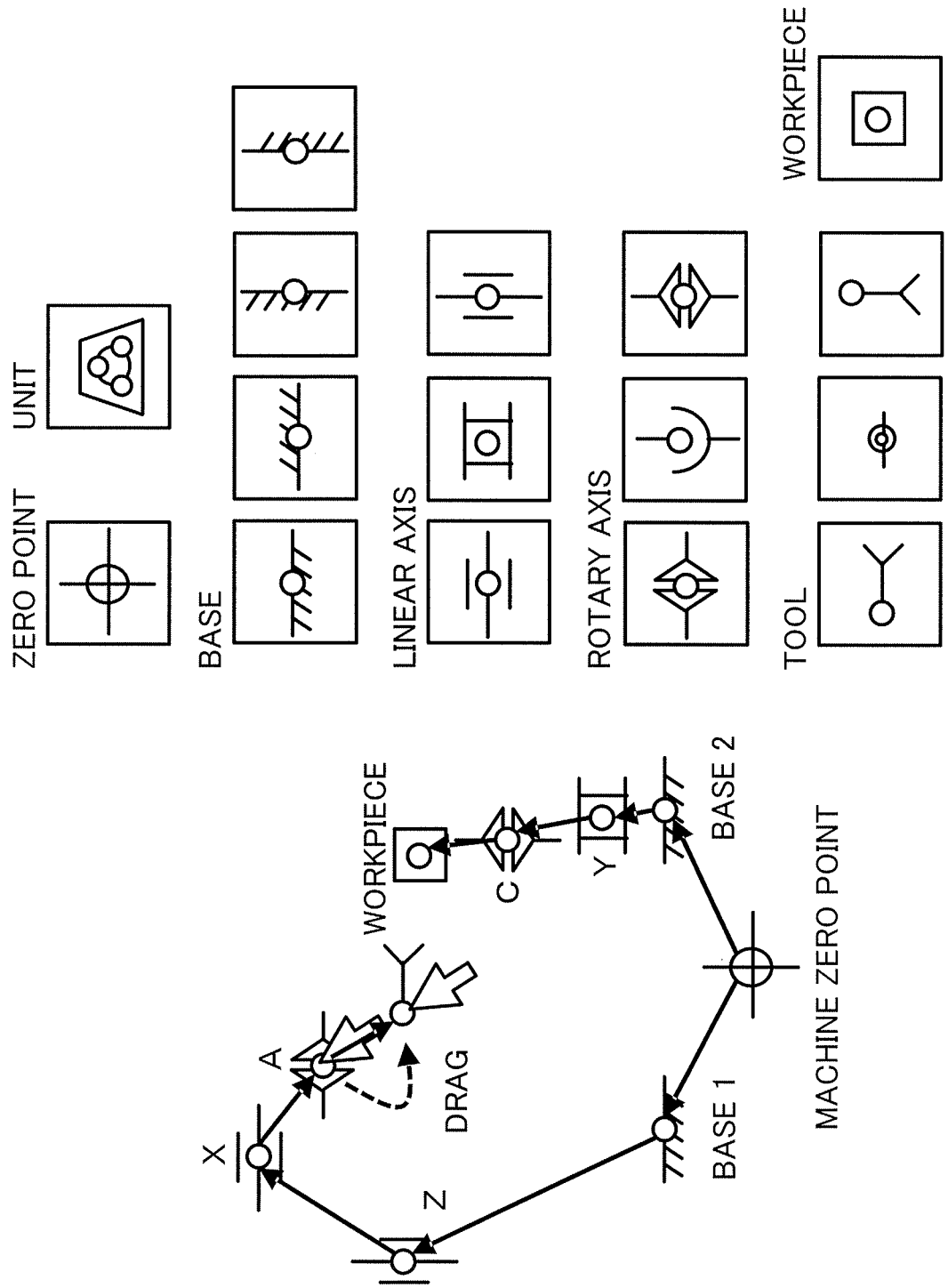
FIG. 14C is a diagram showing an example of the GUI (graphical user interface) in the embodiment of the present invention.
Figure 14D:
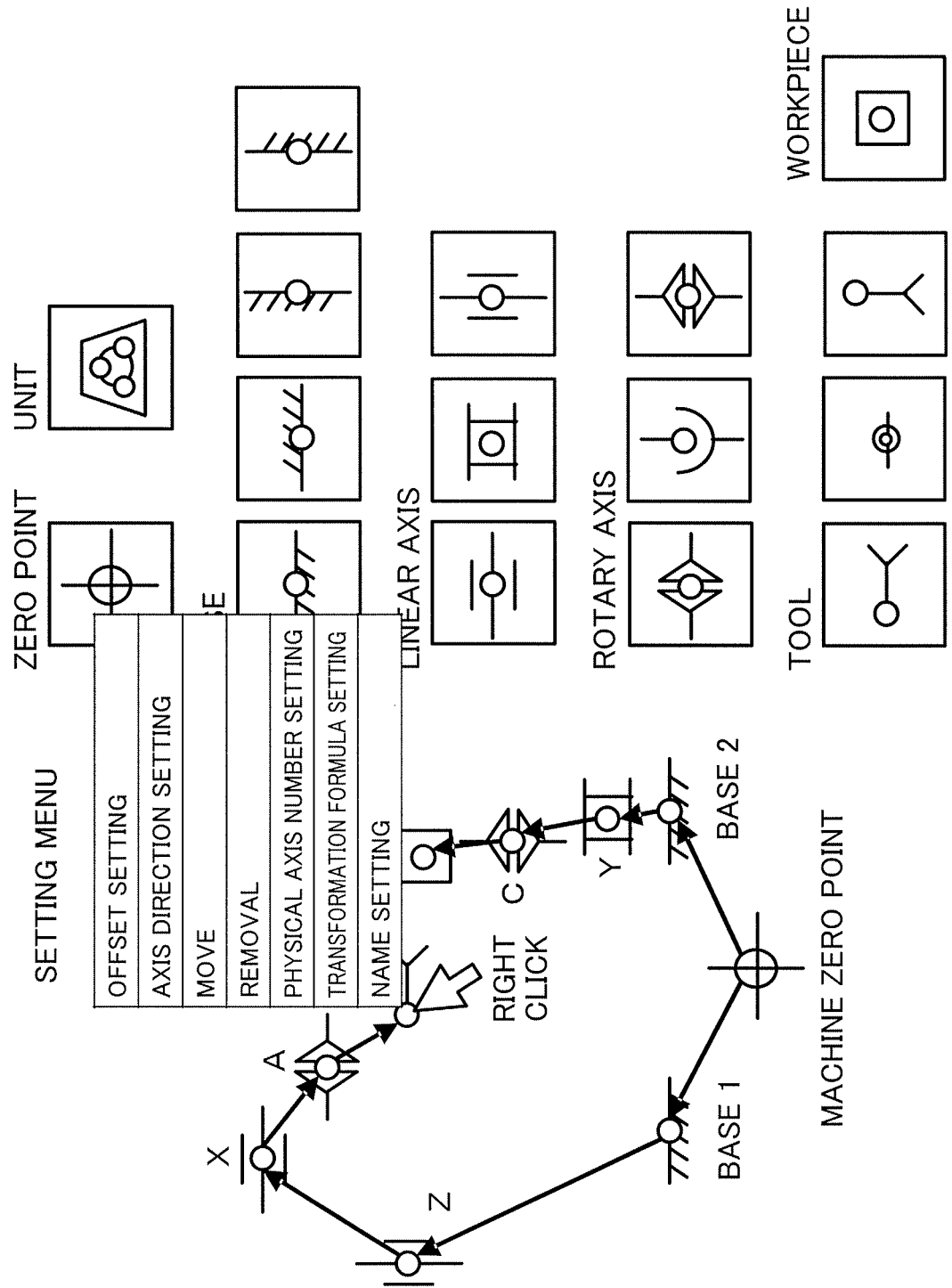
FIG. 14D is a diagram showing an example of the GUI (graphical user interface) in the embodiment of the present invention.

As shown FIG. 14A, the machine configuration tree described above can be graphically displayed on the display 70 and can be simply set on the display 70 by use of a graphic user interface (GUI). For example, as shown in FIG. 14B, the node can be arranged by a drag and drop operation, as shown in FIG. 14C, a parent-child relationship of the nodes can be set by drag operation and as shown in FIG. 14D, a setting menu is opened to set the attribute of the node by a mouse click operation.

Since a machine tool has various machine configurations, various parent-child relationships of constituent elements are provided whereas a numerical controller normally doe not have information on the parent-child relationship of constituent elements so that the numerical controller cannot perform control requiring such information. However, the numerical controller uses the method of generating data having the machine configuration tree described above or having the data structure in the shape of the machine configuration tree, and thereby can control a machine tool or a robot which has various machine configurations, with the result that convenience is enhanced. The user also uses a graphic user interface (GUI) so as to be intuitively set the machine configuration tree to the numerical controller.

[3. Abstraction of Command Address]

As described above, when the machine configuration tree is generated, the axis names are added to the individual axes. Normally, in a machining program used in a numerical controller, a combination between the name and the coordinate value of a destination or a value meaning the amount of move is used so as to command a move.

Figure 15:
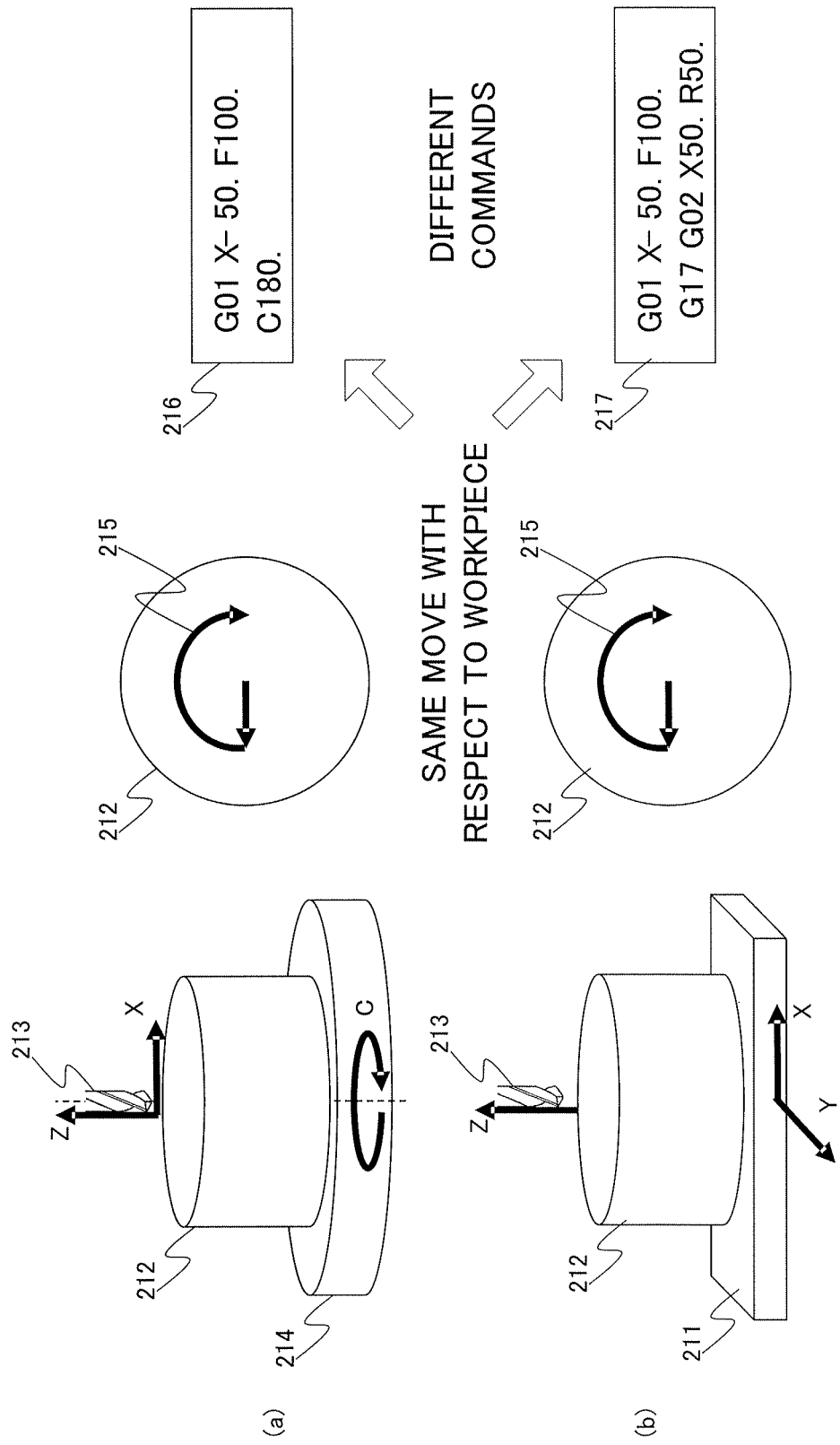
FIG. 15 is a diagram showing an example of a command for a workpiece installed in a normal table.

However, even when the axis name can be arbitrarily set, if the axis configuration of the machine is different, as long as a command is issued with the in axis name, the program is inevitably different. For example, as shown in FIG. 15, when a tool 213 is used to perform machining on a workpiece 212, even if a case where as in (a), the workpiece is placed on a rotary table 214 and a case where as in (b), the workpiece is placed on a direct drive table 211 are the same in the desired machining path 215 of the tool 213 with respect to the workpiece 212, programs are inevitably different such that the command for realizing it is 216 in the case of (a) and the command for realizing it is 217 in the case of (b). Specifically, the programs are different such that in the case of 216, the rotary axis C of the rotary table is moved by 180 degrees so as to realize the arc path whereas in the case of 217 an arc interpolation command is issued with a linear axis XY so as to realize the arc path.

Conventionally, a commandable address is determined for each G code modal, and when the modal is changed, a command address needs to be changed accordingly. For example, when the posture of a tool is indicated in tool tip point control, a commandable address is determined in each mode such that in a type 1 mode, a command is issued with each rotary axis address (for example, address A, B, and C) whereas in a type 2 mode, command is issued with a tool posture vector (address I, J, and K). Hence, for example in the type 1 mode, it is impossible to issue a command with the address I, J, and K whereas in the type 2 mode, it is impossible to issue a command with the rotary axis address A, B, and C.

Hence, in the present invention, instead of the axis name, an abstract address is used which defines the position, the posture and the like of a certain control point on a certain coordinate system. Specifically, first, in order to define an address, a command is issued as in 218 of FIG. 16. In 218, addresses α and β are substituted which are suitable for identifiers (an identifier L1 indicating a first linear axis position and an identifier L2 indicating a second linear axis position) that are previously defined regardless of the actual axis names in the machine configuration, and as the first linear axis position in an orthogonal coordinate system, the address α is defined, and as the second linear axis position in the orthogonal coordinate system, the address β is defined. Likewise, addresses may be substituted which are suitable for identifiers V1, V2 and V3 indicating tool posture vectors that are previously defined regardless of the actual axis names such that the addresses indicating the tool posture vectors are defined. Alternatively, addresses may be substituted which are suitable for identifiers R1 and R2 indicating first and second rotary axis positions that are previously defined regardless of the actual axis names such that the addresses Indicating the rotary axis positions are defined. When these are not defined in the program, default addresses which are set with parameters in the numerical controller 100 are defined as addresses indicating the abstract meanings of the first linear axis position, the second linear axis position and the like. Thereafter, as shown in 219 of FIG. 16, these α and β are used in the program, and thus in any machine configuration or in machines whose actual axis names are different, programs can be described with the common form. With respect to commands for the same control point, as in 220 of FIG. 16, the address is only changed, and thus it is possible to individually use various command methods suitable for a program producer such that, for example, a command is issued with a vector in order to determine the direction of a tool in a certain block or a command is issued with a rotary axis angle in another block.

As described above, in the present embodiment, as the command value, regardless of the axis names included in the graph of the machine configuration, an arbitrary address which is allocated to an identifier previously defined for each meaning can be used. The "meanings" described above include the position of the control point, the posture of the control point and the position of the angle of the rotary axis for determining the posture.

[4. Automatic Insertion of Control Point and Coordinate System]

Although as described in "2. Generation of machine configuration tree", each node of the machine configuration can have information necessary for the node itself being the control point or the coordinate system, each node can be formed such that it doesn't have the necessary information. When the node does not have the information necessary for the node itself being the control point or the coordinate system, in order to specify, as the control points, various positions on the machine configuration and set coordinate systems in various places on the machine configuration, the following method is performed by use of the machine configuration tree generated in "2. Generation of machine configuration tree" described above.

Figure 17A:
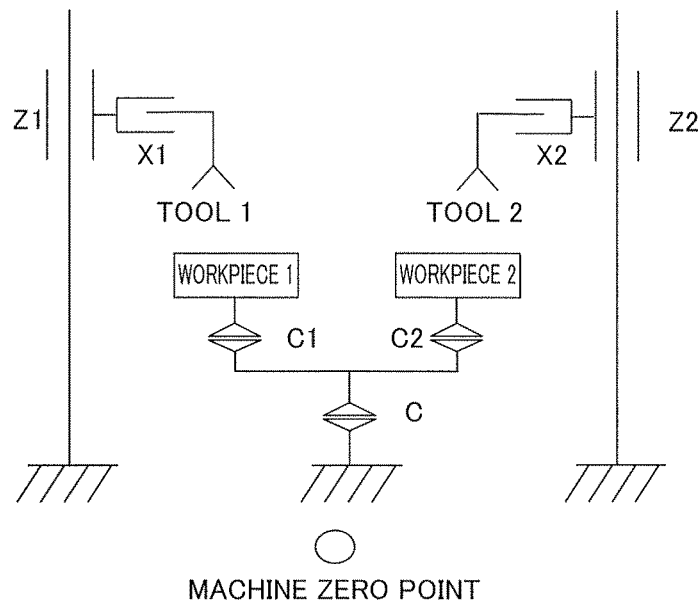
FIG. 17A is a diagram showing an example of a machine which is a target for the generation of the machine configuration tree.
Figure 17B:
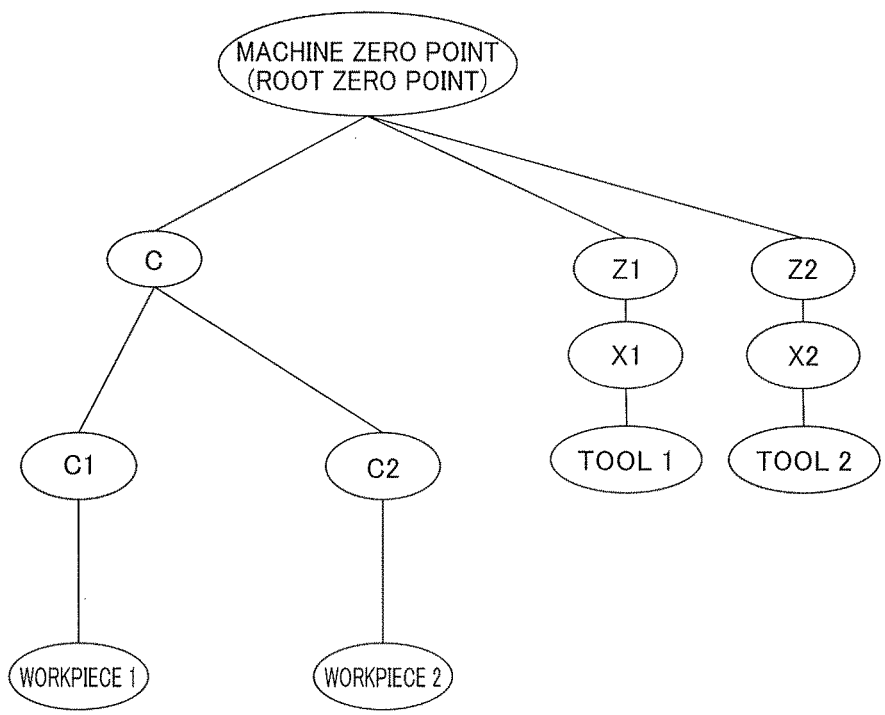
FIG. 17B is a diagram showing an example or a machine configuration tree corresponding to the machine which is a target for the generation of the machine configuration tree.

For example, in a rotary index machine 300 shown in FIG. 17A, an X1 axis is set perpendicular to a Z1 axis, and a tool 1 is installed in the X1 axis. An X2 axis is set perpendicular to a Z2 axis, and a tool 2 is installed on the X2 axis. Furthermore, in a table, on a C axis, a C1 axis and a C2 axis are set in parallel, and in the C1 axis and the C2 axis, workpiece 1 and a workpiece 2 are respectively installed. When this machine configuration is represented by a machine configuration tree, the machine configuration tree shown in FIG. 17B is provided.

Figure 18:
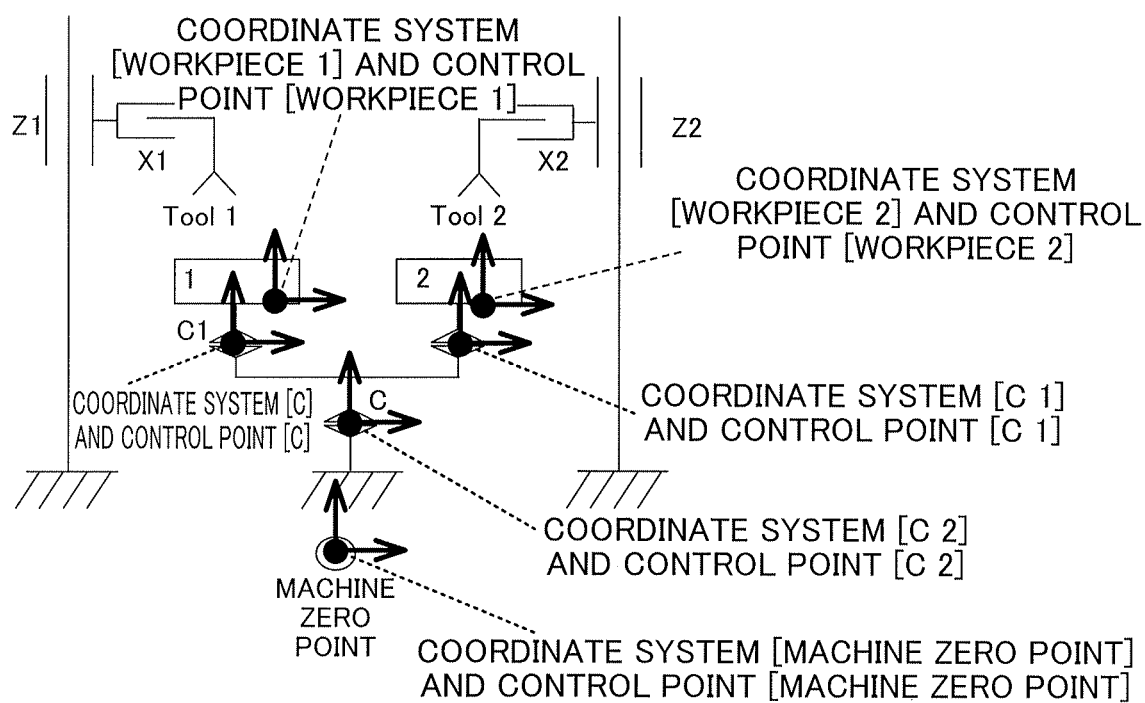
FIG. 18 is a diagram showing an example where a coordinate system and a control point are inserted into each node in the machine in the embodiment of the present invention.
Figure 19:
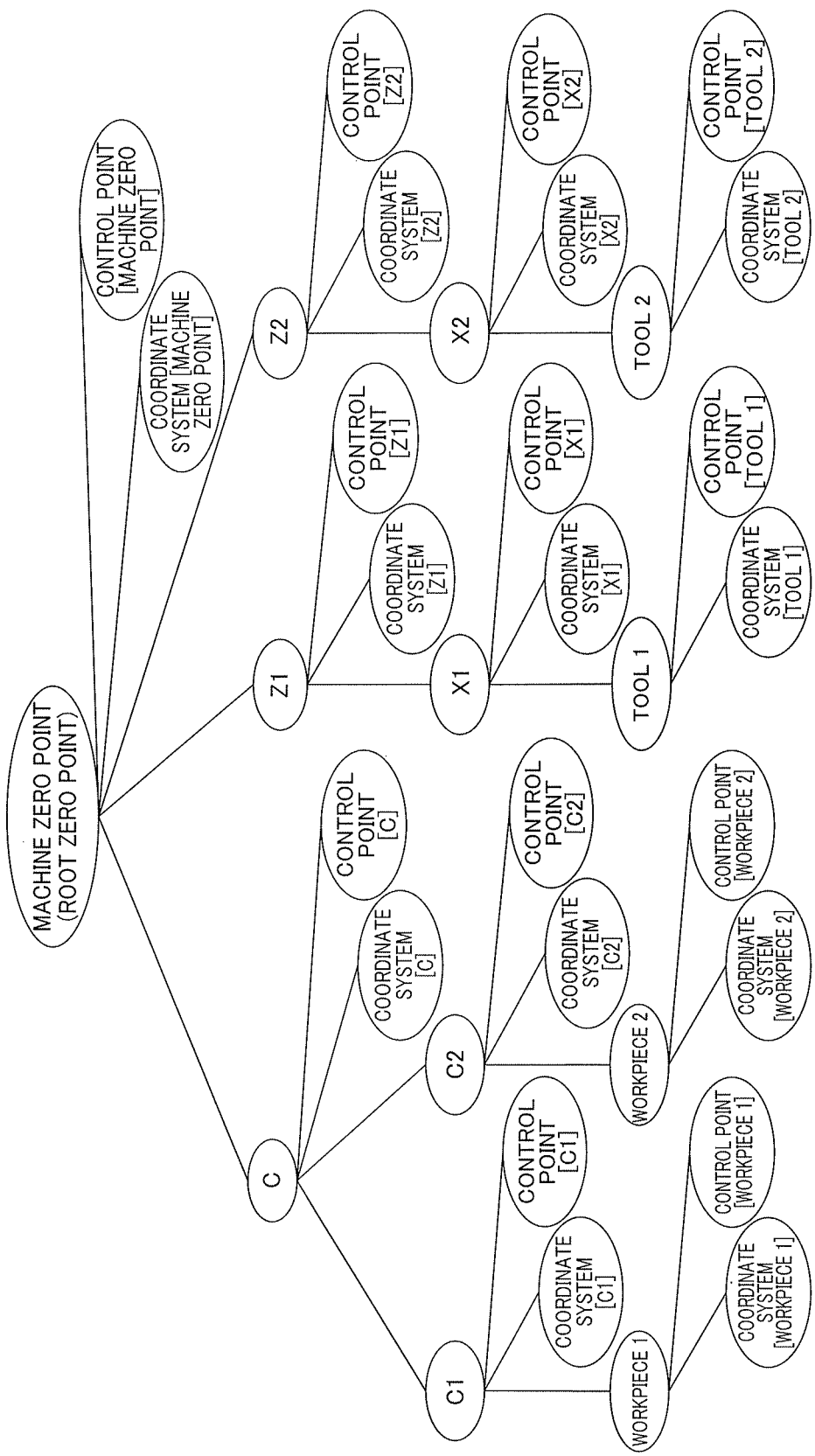
FIG. 19 is a diagram showing an example of the machine configuration tree into which the coordinate system and the control point are inserted in the embodiment of the present invention.

In an example of a series of nodes leading from individual workpieces to the machine zero point, as shown in FIG. 18, a coordinate system and a control point are automatically inserted into each of the machine zero point, the C axis, the C1 axis, the C2 axis, the workpiece 1 and the workpiece 2. This is performed not only on the table but also on the series of nodes leading from individual tools to the machine zero point, that is, all the X1 axis, the X2 the Z1 axis, the Z2 axis, the tool 1 and the tool 2. Consequently as shown in FIG. 19, into all the nodes constituting the machine configuration tree, the control points and the coordinate systems corresponding to the individual nodes are automatically inserted. Normally, when machining is performed, the coordinate system is specified in the workpiece, and the tool is specified as the control point. In this way, it is possible to cope with various cases such as a case where in order to move a work itself to a predetermined position, the control point is desired to be specified in the workpiece and a case where in order to use a certain tool to polish another tool, the coordinate system is desired to be set in the tool itself.

Figure 20A:
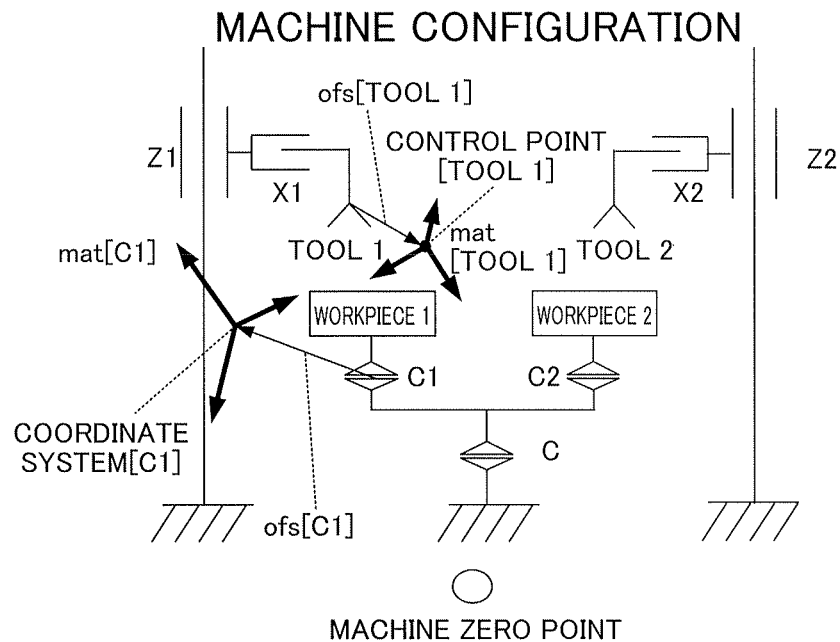
FIG. 20A is a diagram showing an example of the machine in which an offset and a posture matrix are inserted into each node in the embodiment of the present invention.
Figure 20B:
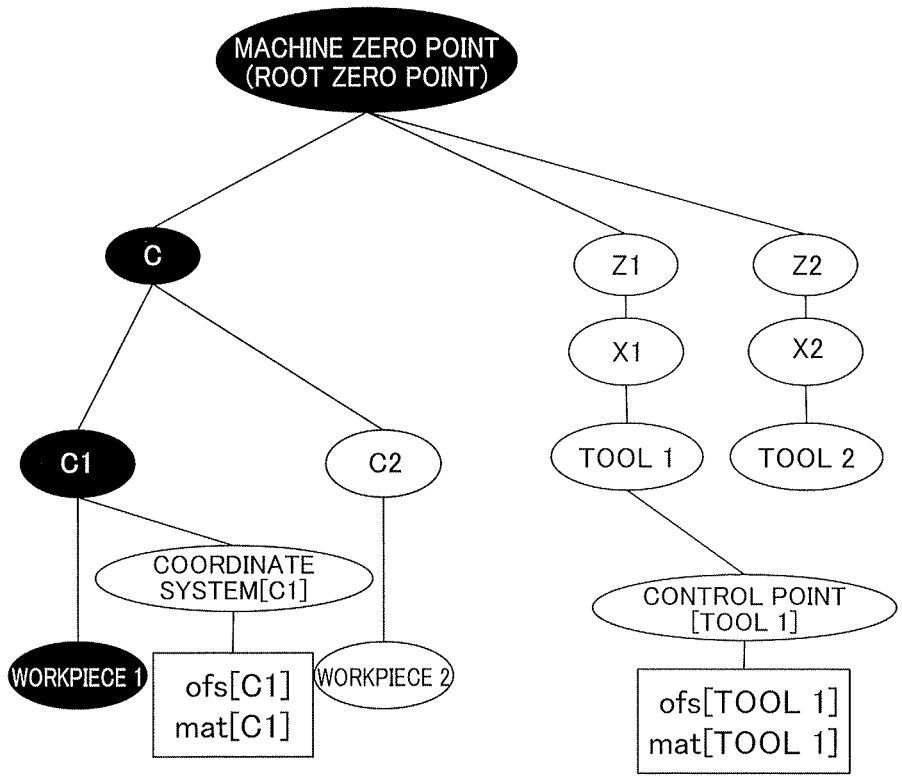
FIG. 20B is a diagram showing an example where the offset and the posture matrix are inserted into each node in the machine in the embodiment of the present invention.
Figure 21:
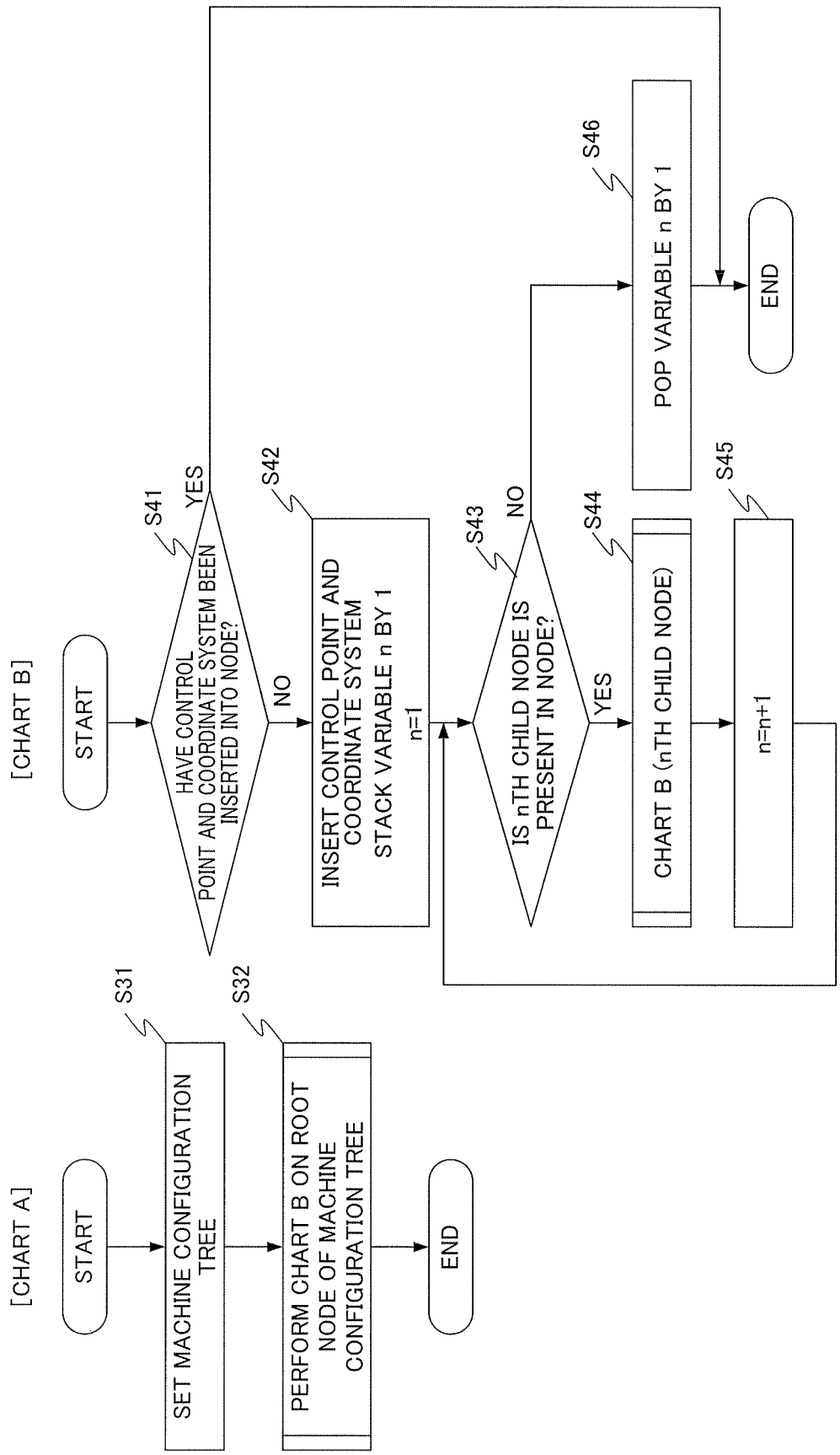
FIG. 21 is a diagram showing a generation operation of inserting the control point into the machine configuration tree in the embodiment of the present invention.

As shown in FIG. 20A, each of the control points and the coordinate systems has an offset. Hence, a point away from the center the node can be set to a control point or a coordinate system zero point. Furthermore, each of the control points and the coordinate systems has a posture matrix. When this posture matrix is the posture matrix of the control point, it indicates the posture (the direction, the inclination) of the control point whereas when this posture matrix is the posture matrix of the coordinate system, it indicates the posture of the coordinate system. In a machine configuration tree shown in FIG. 20B, the offset and the posture matrix are expressed so as to be associated with the nodes corresponding thereto. Furthermore, each of the control points and the coordinate systems has information on whether or not the "move" and the "cross-offset" of the node present on a path up to the route of the machine configuration tree are individually added, and the information can be set.

A flowchart obtained by generalizing the method of automatically inserting the control point and the coordinate system described above is shown in FIG. 21. Specifically this flowchart includes a chart A and a chart B, and as will be described later, the chart B is performed in the middle of the chart A.

The chart A will first be described. In step S31, the graph generation portion 111 sets a machine configuration tree. In step S32, the chart B is performed, and the flow of the chart A is completed.

The chart B will then be described. In step S41 of the chart B, when the node has been inserted the control point and the coordinate system (YES in S41), the flow is completed. When the node has not been inserted the control point and the coordinate system (NO in S41), the processing is transferred to step S42.

In step S42, the control point coordinate system insertion portion 112 inserts the control point and the coordinate system into the node, and stacks a variable n by 1. A setting is made such that n=1.

In step S43, when the n$^{th}$ child node is present in the node (YES in S43), the processing is transferred to step S44. When the n$^{th}$ child node is not present in the node (NO S43), the processing is transferred to step S46.

In step S44, on the n$^{th}$ child node, the chart B itself is performed in a recursive manner.

In step S45, n is incremented by 1. In other words, the increment is performed such that n=n+1, and the processing is returned to step S43.

In step S46, the variable n is popped by 1, and the flow of the chart B is completed.

Figure 22:
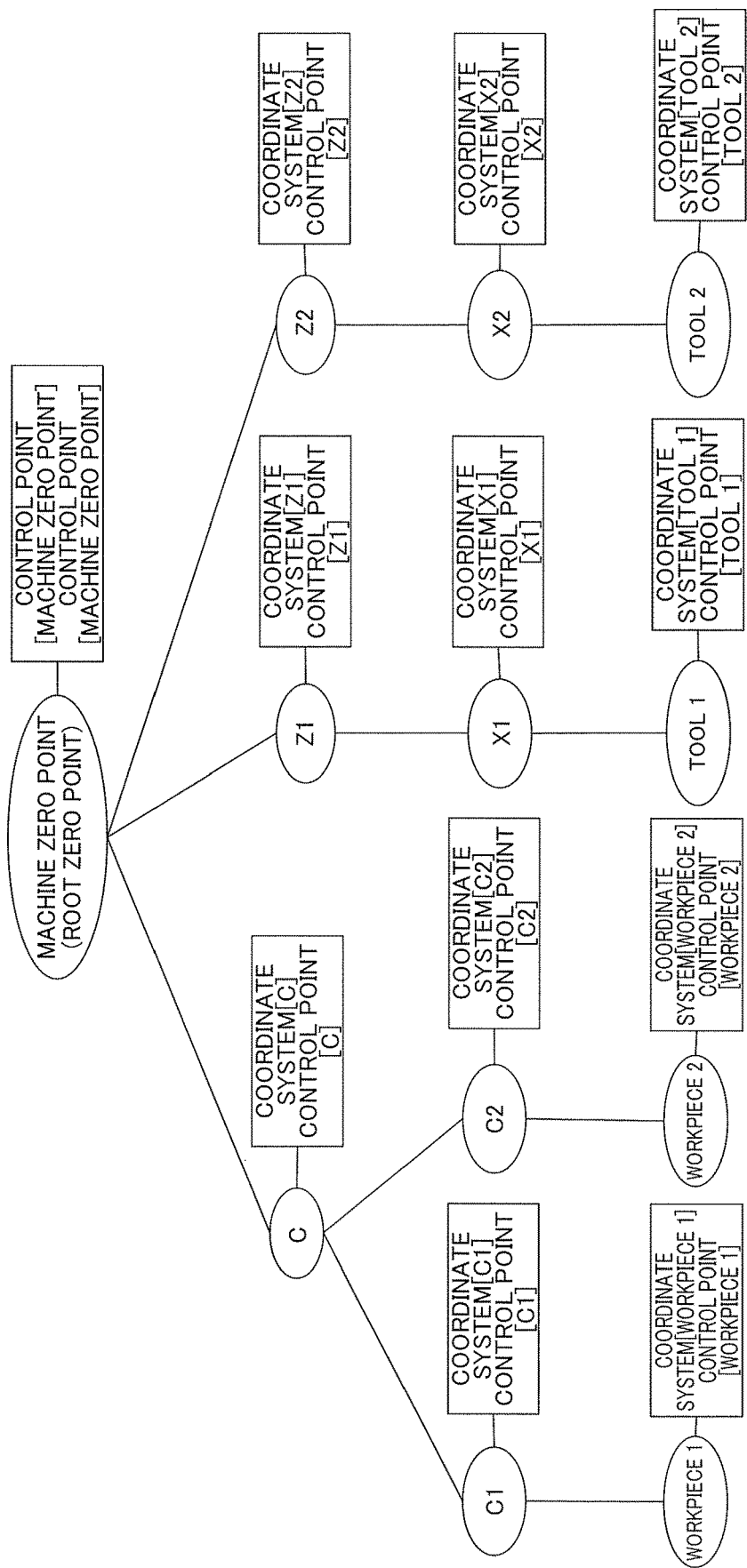
FIG. 22 is a diagram showing an example of the machine configuration tree into which the coordinate system and the control point are inserted in the embodiment of the present invention.
Figure 23:
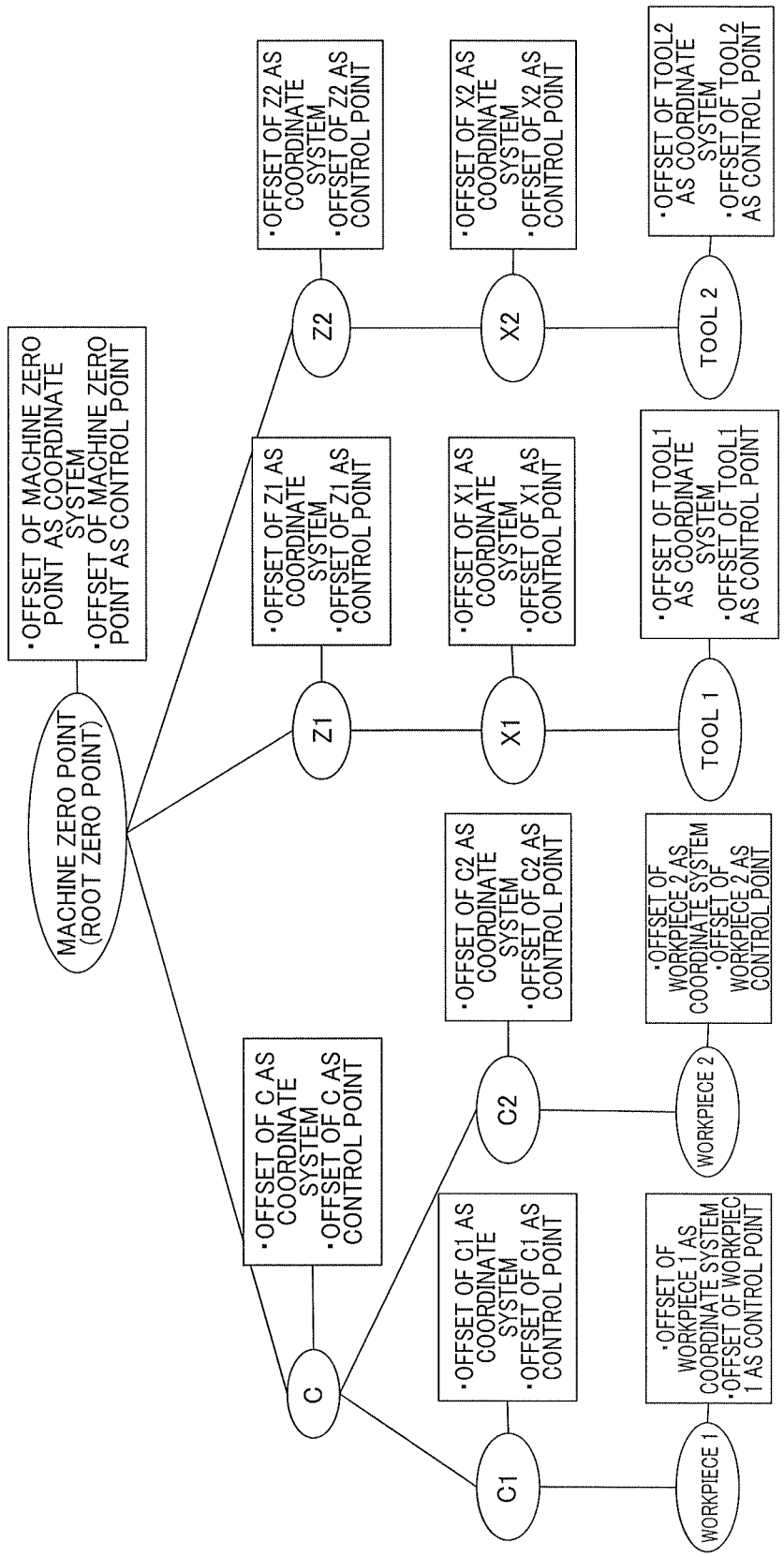
FIG. 23 is a diagram showing an example of the machine configuration tree in the embodiment of the present invention.

By the method described above, the control point coordinate system insertion portion 112 inserts, as nodes, the control point and the coordinate system into the individual nodes of the graph in the machine configuration. Although in the above description, the example where the control point and the coordinate system are added as nodes is described, an embodiment is also possible in which as shown in FIG. 22, the control point coordinate system insertion portion 112 makes the individual nodes of the graph in the machine configuration have the control point and the coordinate system as information. As described in "2. Generation of machine configuration tree", the graph generation portion can also generate the machine configuration tree (the machine configuration tree which has information necessary for each node being the control point or the coordinate system) as shown in FIG. 23. In this case, the machine configuration tree has already had the information as the control point or the coordinate system, and thus it is not always necessary to provide the control point coordinate system insertion portion.

[5. Calculation Method of Control Point Position and Control Point Posture]

Figure 24:
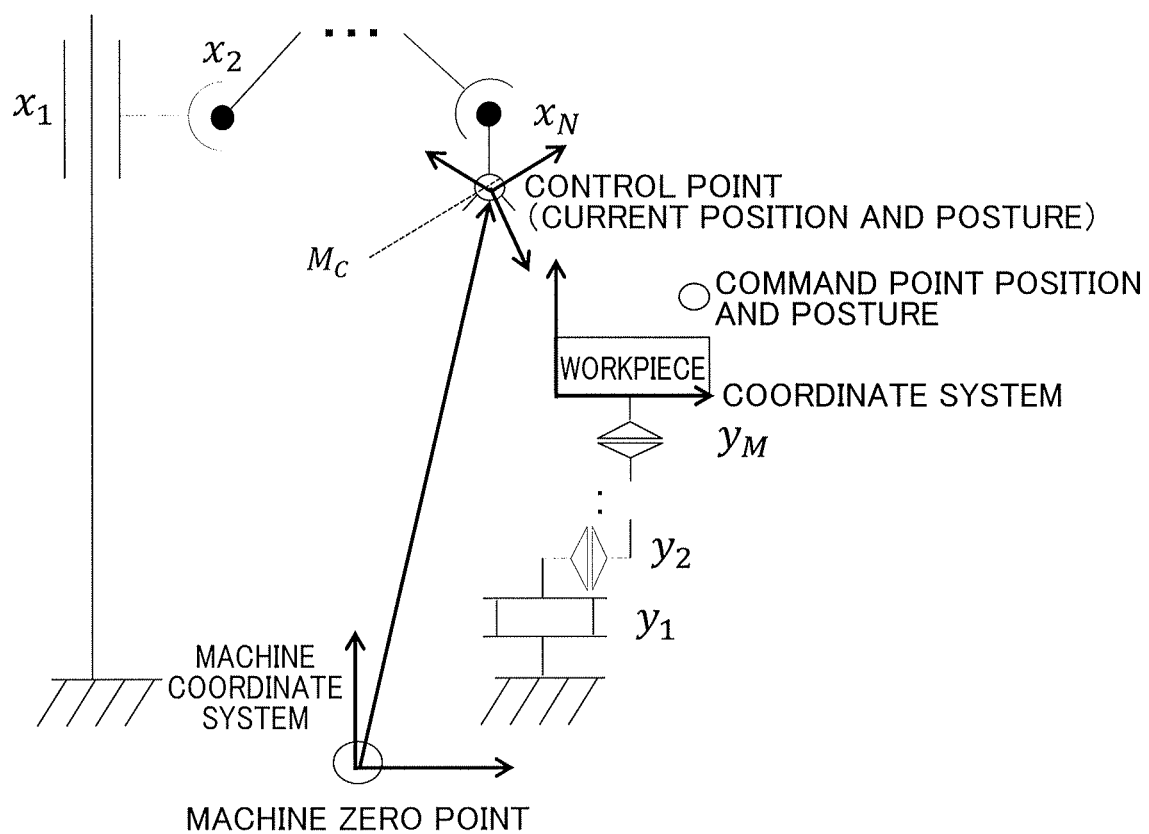
FIG. 24 is a diagram showing a control point position vector and a control point posture matrix with respect to a machine zero point in a machine coordinate system in the embodiment the present invention.

As shown in FIG. 24, when a homogeneous matrix which indicates the position and the posture of a certain control point in the machine configuration tree with respect to the route of the machine configuration tree is assumed to be $M_C$, this can be determined as follows.

First, nodes which are present between a certain node and a certain node in the machine configuration tree and which are aligned are defined as a path. For example, in FIG. 19, a path p1 from a node Z1 to a control point [tool 1] is represented as follows.

$$p_1 = \{Z1, X1, \text{tool } 1, \text{control point [tool 1]}\} \quad \text{[Formula 3]}$$

It is assumed that a path p2 from a route in the machine configuration tree to a certain control point is as follows.

$$p_2 = \{x_1, x_2, \ldots, x_N, \text{control point}\} \quad \text{[Formula 4]}$$

A start point $x_1$ in the path is the route. The homogeneous matrix $M_C$ of a position and a posture with respect to the route in the control point represented by the path is calculated by Formula 5, $$M_C = \{\Pi_{i=1}^{N} S(a_{x_i}, b_{x_i})\} M_{[ctrl]} \quad \text{where} \quad \Pi_{i=1}^{n} M_i = M_1 M_2 \ldots M_n \quad \text{[Formula 5]}$$

where the meanings of symbols are as follows.
S: Homogeneous transformation matrix of each node;
N: Number of a series of nodes leading from the route of the machine configuration tree to the control point;
$M_{[ctrl]}$: Homogeneous matrix of a relative offset and a posture with respect to the parent node of the control point which is defined, according to the mathematical formula of [Formula 2], from an offset vector and a posture matrix defined in the control point;
$a_{xi}$: The cross-offset of a node xi is added (1) or is not added (0); and
$b_{xi}$: The move of the node x1 is added (1) or is not added (0). Here, $a_{xi}$ and $b_{xi}$ are information which can also be specified when the control point is specified, and the details thereof will be described in "8. Customization of coordinate system derived from machine configuration tree" which will be described later.

The homogeneous transformation matrix S is changed depending on the type of node (linear axis/rotary axis/unit/control point/coordinate system and the like), and is represented as follows. In the case of the linear axis, the homogeneous transformation matrix S is calculated by Formula 6, $$S(a_{x_i}, b_{x_i}) = \begin{pmatrix} 1 & 0 & 0 & a_{x_i}\overrightarrow{ofs_{x_i}} \\ 0 & 1 & 0 & \\ 0 & 0 & 1 & \\ 0 & 0 & 0 & 1 \end{pmatrix} \begin{pmatrix} 1 & 0 & 0 & b_{x_i}x_i\overrightarrow{v_{x_i}} \\ 0 & 1 & 0 & \\ 0 & 0 & 1 & \\ 0 & 0 & 0 & 1 \end{pmatrix} \quad \text{[Formula 6]}$$

where the meanings of symbols are as follows.
$x_i$: Coordinate value of node xi;
$ofs_{xi}$: Relative offset vector with respect to parent node of node xi; and
$v_{xi}$: Movement direction vector of node xi.

In the case of the rotary axis, the homogeneous transformation matrix S is calculated by Formula 7, $$S(a_{x_i}, b_{x_i}) = \begin{pmatrix} 1 & 0 & 0 & a_{x_i}\overrightarrow{ofs_{x_i}} \\ 0 & 1 & 0 & \\ 0 & 0 & 1 & \\ 0 & 0 & 0 & 1 \end{pmatrix} R(b_{x_i}, x_i, v_1, v_2, v_3) \quad \text{[Formula 7]}$$

$$R(x_i, v_1, v_2, v_3) = \begin{pmatrix} v_1^2(1-\cos x_i) + \cos x_i & v_1 v_2(1-\cos x_i) - v_1\sin x_i & v_1 v_3(1-\cos x_i) + v_2\sin x_i & 0 \\ v_1 v_2(1-\cos x_i) + v_3\sin x_i & v_2^2(1-\cos x_i) + \cos x_i & v_3 v_2(1-\cos x_i) - v_1\sin x_i & 0 \\ v_1 v_3(1-\cos x_i) - v_2\sin x_i & v_2 v_3(1-\cos x_i) + v_1\sin x_i & v_3^2(1-\cos x_i) + \cos x_i & 0 \\ 0 & 0 & 0 & 1 \end{pmatrix}$$

where the meanings of symbols are as follows.
$v_1$: First component of rotary axis direction vector of node xi;
$v_2$: Second component of rotary axis direction vector of node xi; and
$v_3$: Third component of rotary axis direction vector of node xi;

In the case of the unit, the homogeneous transformation matrix S is calculated by Formula 8, $$S(a_{x_i}, b_{x_i}) = \begin{pmatrix} 1 & 0 & 0 & a_{x_i}\overrightarrow{ofs_{x_i}} \\ 0 & 1 & 0 & \\ 0 & 0 & 1 & \\ 0 & 0 & 0 & 1 \end{pmatrix} T(b_{x_i}) \quad \text{[Formula 8]}$$

where the meanings of symbols are as follows.
T(0): Unit matrix (non-transformation matrix); and
T(1): Homogeneous transformation matrix from connection point 120 to connection point 110 defined in a unit node. The homogeneous transformation matrix of the unit is a homogeneous transformation matrix such as T in the mathematical formula of [Formula 1] described previously which is defined for each unit. When the homogeneous transformation matrix S is not particularly specified, the homogeneous transformation matrix S is assumed to be a unit matrix.

[6. Calculation Method of Command Point Position and Command Point Posture]

Figure 25:
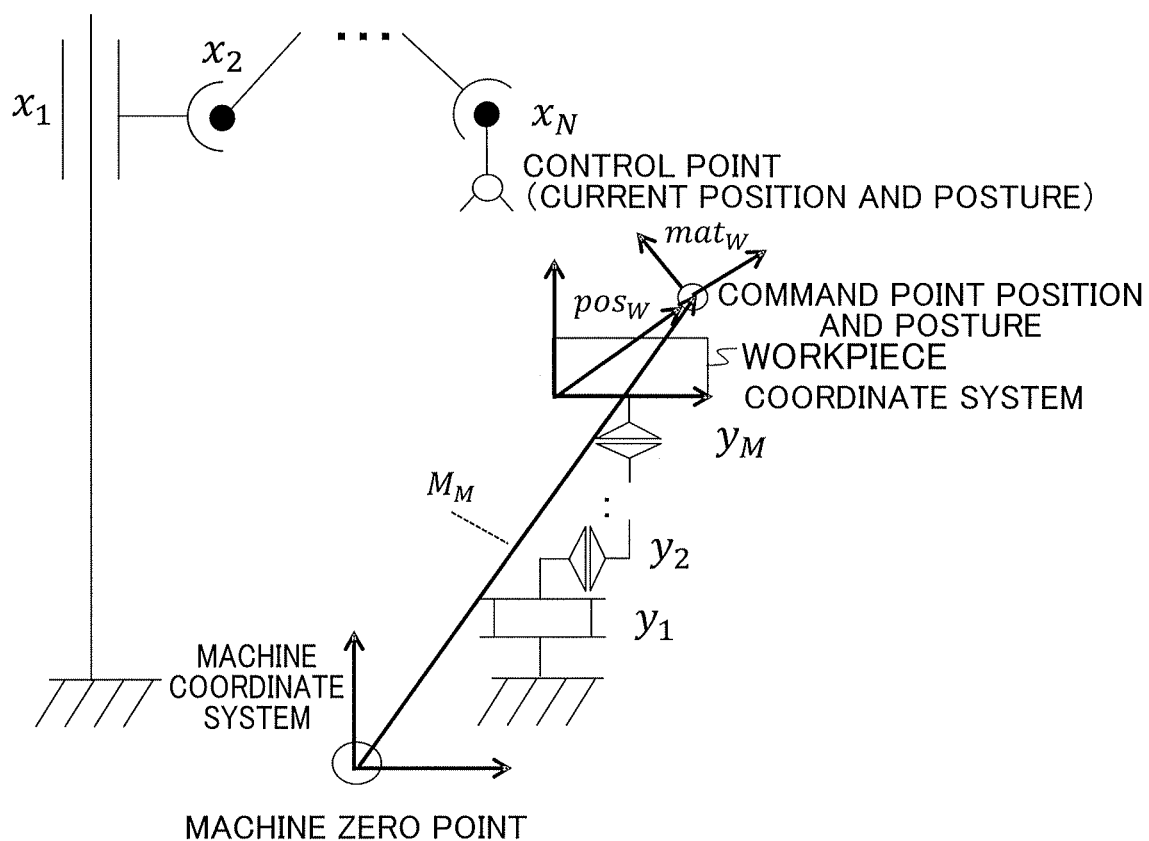
FIG. 25 is a diagram showing a command value position vector and a command value posture matrix with respect to the machine zero point in the machine coordinate system in the embodiment the present invention.

When as shown in FIG. 25, as a command value on a certain specified coordinate system, a command position vector $pos_w$ and a command posture matrix $mat_w$ are specified, a homogeneous matrix $M_M$ indicating a position and a posture with respect to the route of the machine configuration tree for this command value is determined by a formula below.

The homogeneous matrix $M_W$ of the command value is first defined as follow.

$$M_w = \begin{pmatrix} mat_w & \overrightarrow{pos_w} \\ 0 \quad 0 \quad 0 & 1 \end{pmatrix} \quad \text{[Formula 9]}$$

As in the case of the control point, it is assumed that a path $p_3$ from a route in the machine configuration tree to a certain coordinate system is as follows.

$$p_3 = \{x_1, x_2, \ldots, x_L, \text{coordinate system}\} \quad \text{[Formula 10]}$$

In this way, the homogeneous matrix $M_M$ is calculated by Formula 11, $$M_M = \{\Pi_{i=1}^L S(a_{xi}, b_{xi})\} M_{[coord]} M_w \text{ where}$$
$$\Pi_{i=1}^n M_i = M_1 M_2 \ldots M_n \quad \text{[Formula 11]}$$

where the meanings of symbols are as follows.
S: Homogeneous transformation matrix of each node;
L: Number of a series of nodes leading from the route of the machine configuration tree to the coordinate system;
$M_{[coord]}$: Homogeneous matrix of a relative offset and a posture with respect to the parent node of the coordinate system which is defined, according to the mathematical formula of [Formula 2], from an offset vector and a posture matrix defined in the coordinate system;
$a_{xi}$: The cross-offset of a node xi added (1) or is not added (0); and
$b_{xi}$: The move of the node x1 is added (1) or is not added (0). Here, $a_{xi}$ and $b_{xi}$ are information which can be specified when the coordinate system is specified, and the details thereof will be described in "8. Customization of coordinate system derived from machine configuration tree" which will be described later. The homogeneous transformation matrix S is the same as that described by use of the mathematical formulas of [Formula 6] to [Formula 8].

[7. Method of Specifying Control Point and Coordinate System within Program]

An example of a method of specifying each node as the control point or the coordinate system within a program when in the "2. Generation of machine configuration tree" described above, the machine configuration tree is generated such that each node has the information necessary for each node being the control point or the coordinate system is first shown in FIG. 26.

In a command illustrated in FIG. 26, the first half is a sentence example specifying the coordinate system, and the second half is a sentence example specifying the control point. Although the description of FIG. 26 is repeated, the details of a command in each line within the program will be described below.

By the first line "G54.9 P<workpiece 1>;", a node [workpiece 1] is specified as the coordinate system. By the second line "G54.8 P<workpiece 1><WORK1>;", another identifier of "WORK1" is set to the node [workpiece 1]. By the third line "G54.9 P<WORK1>;", the node [workpiece 1] specified by another identifier of "WORK1" as the coordinate system. By the fourth line "G54.7 P<C1>X_Y_Z_;", the coordinate system cross-offset of a node [C1] is set fifth line "G54.6 P<C1> I_J_K_;" the coordinate system posture matrix of the node [C1] is set by Roll/Pitch/Yaw. By the sixth line "G54.9 P<C1>;", the node [C1] is specified as the coordinate system, and the cross-offset and the posture matrix described above are added. By the seventh line "G43.9 <tool 1>;", a node [tool 1] is specified as the control point. By the eighth line "G43.8 P<tool 1><TOOL1>;", another identifier of "TOOL1" set to the node [tool 1]. By the ninth line "G43.9 P<TOOL1>;", the node [tool 1] is specified by another identifier of "TOOL1" as the control point. By the tenth line "G43.7 P<B1> X_Y_Z_;", the control point cross-offset of a node [B1] is set. By the eleventh line "G43.6 P<B1> I_J_K_;", the control point posture matrix of the node [B1] is set by Roll/Pitch/Yaw. By the twelfth line "G43.9 P<B1>;", the node [B1] is specified as the control point, and the cross-offset and the posture matrix described above are added.

An example of a method or specifying, within a program, the control point and the coordinate system inserted into the machine configuration tree by "4. Automatic insertion of control point and coordinate system" described above will be shown in FIG. 27.

In a command illustrated in FIG. 27, the first half is a sentence example specifying the coordinate system, and the second half is a sentence example specifying the control point. Although the description of FIG. 27 is repeated, the details of a command in each line within the program will be described below.

By the first line "G54.9 <coordinate system [workpiece 1]>;", the coordinate system [workpiece 1] is specified. By the second line "G54.8 P <coordinate system [workpiece 1]><WORK1>;", an identifier of "WORK1" set to the coordinate system [workpiece 1]. By the third line "G54.9 P<WORK1>;", the coordinate system [workpiece 1] is specified by another identifier of "WORK1". By the fourth line "G54.7 P<coordinate system [C1]> X_Y_Z_;", the cross-offset of the coordinate system [C1] is set. By the fifth line "G54.6 P<coordinate system [C1]> I_J_K_;", the posture matrix of the coordinate system [C1] is set by Roll/Pitch/Yaw. By the sixth line "G54.9 P<coordinate system [C1]>;", the coordinate system [C1] is set, and the cross-offset and the posture matrix described above are added. By the seventh line "G54.9 <control point [tool 1]>;", the control point [tool 1] is specified. By the eighth line "G54.8 P<control point [tool 1] <TOOL1>;", an identifier of "TOOL1" is set to the control point [tool 1]. By the ninth line "G54.9 P<TOOL1>;", the control point [tool 1] is specified by another identifier of "TOOL1". By the tenth line "G54.7 P<control point [B1]> X_Y_Z_;", the cross-offset of the control point [B1] is set. By the eleventh line "G54.6 P<control point [B1]> I_J_K_;", the posture matrix of the control point [B1] is set by Roil/Pitch/Yaw. By the twelfth line "G54.9 P<control point [B1]>;", the control point [B1] is specified, and the cross-offset and the posture matrix described above are added.

Whether each node has the information necessary for each node being the control point or the coordinate system or whether each node does not have the information as described above, it is possible to specify an appropriate place in the machine configuration tree as the control point or the coordinate system. Although in FIG. 26, the numbers of G codes for specifying toe control point and the coordinate system are separate, in FIG. 27, the G codes for specifying toe control point and the coordinate system can be made common. Although as described above, the coordinate system control point insertion portion and the identifier allocation portion are not indispensable in the practice of the present invention, they may be introduced.

[8. Customization of Coordinate System Derived from Machine Configuration Tree]

As described above, the suitable coordinate system in the machine configuration tree can be selected by a program command, and a command value on the selected coordinate system can be transformed into a machine coordinate value with the mathematical formulas of [Formula 9] to [Formula 11] as described above. In this transformation, a series of $a_{xi}$ and $b_{xi}$ corresponding to the individual nodes in the path p3 are basically calculated as follows so as to be all 1.

$$p_3 = \{x_1, x_2, \ldots, x_L, \text{coordinate system}\}$$

$$a_{P3} = \{a_{x_1}, a_{x_2}, \ldots, a_{x_L}, a_{[coord]}\} = \{1, 1, \ldots, 1, 1\}$$

$$b_{P3} = \{b_{x_1}, b_{x_2}, \ldots, b_{x_L}, b_{[coord]}\} = \{1, 1, \ldots, 1, 1\} \quad \text{[Formula 12]}$$

In this case, all the cross-offsets and the moves of the series of nodes are added.

Here, $a_{p3}$ and $b_{p3}$ have elements corresponding to the individual elements of the path p3 so as to be able to be regarded as accompanying paths. Hence, they are referred to as the accompanying paths $a_{p3}$ and $b_{p3}$ of p3.

Incidentally, as described previously in "Problems to Solved by Invention", it may be preferable that the coordinate system is not rotated to follow only a specific axis. For example, a case where in FIGS. 20A and 20B, on a coordinate system defined in a path $p_4$ below, it is desired to perform turning with a C1 axis, it is easy to use the coordinate system when the coordinate system is not rotated to follow the C1 axis.

$p_4 = \{$ machine zero point, C, $C_1$, work 1, coordinate system $\}$ [Formula 13]

In this case, accompanying paths $a_{p4}$ and $b_{p4}$ are specified as described below, and thus it is possible to customize the coordinate system such that the coordinate system is not rotated to follow only the C1 axis.

$a_{p4} = \{a_{machine\ zero\ point}, a_C, a_{C_1}, a_{work\ 1}, a_{coordinate\ system}\} = \{1, 1, 1, 1, 1\}$ $b_{p4} = \{b_{machine\ zero\ point}, b_C, b_{C_1}, b_{work\ 1}, b_{coordinate\ system}\} = \{1, 1, 0, 1, 1\}$ [Formula 14]

As described above, the accompanying path is specified as necessary on the specified coordinate system, and thus it is possible to customize the coordinate system such that the coordinate system is suitable according to the usage. The accompanying path can be specified cy a program command as shown in FIG. 28. The details of the program will be described here. By a command of G254. 9P<workpiece 1>Q<C1>0, ac1 on the coordinate system inserted into the workpiece 1 can be specified so as to be 0.

Moreover, by a command of G154. 9P<workpiece 1>Q<C1>0, bc1 on the coordinate system inserted into the work 1 can be specified so as to be 0.

Then, by a command of G54. 9P<workpiece 1>, the coordinate systems [workpiece 1] which are customized so as to be ac1=0 and bc1=0 can be specified.

Since an accompanying path is likewise present in the control point in addition to the coordinate system, the accompanying path is likewise specified with a program, and thus the customized control point can be used.

As described above, in the present embodiment, the information for specifying the coordinate system and the control point is changed, and thus it is possible to arbitrarily customize the coordinate system and the control point. In particular, in the coordinate system and the control point, it is possible to remove the influence of a specific node, specifically, an influence caused by the move and offset of the specific node.

[9. Movement Pulse Generation Method]

Then, the numerical controller 100 according to the embodiment of the present invention interprets a command value within a program commanded by the method of "3. Abstraction of command address" as a coordinate value on the coordinate system specified by the method of "7. Method of specifying control point and coordinate system within program" and "8. Customization of coordinate system derived from machine configuration tree", and generates a movement pulse necessary for moving the control point such that the coordinate value of the specified control point is the command value.

Specifically, first, by the method of "6. Calculation method of command point position and command point posture", the first coordinate transformation formula of the command value is determined from the coordinate system specified and the machine configuration tree. Then, the second coordinate transformation formula of the control point is determined from the control point specified and the machine configuration tree the method of "5. Calculation method of control point position and control point posture". Then, a hypercomplex multidimensional simultaneous equation for defining that the first coordinate transformation formula is equal to the second coordinate transformation formula is determined. Finally, the solution of the hypercomplex multidimensional simultaneous equation which is calculated by use of, for example, a Gröbner basis is used, and thus a movement pulse used in a movement command is generated.

Figure 29:
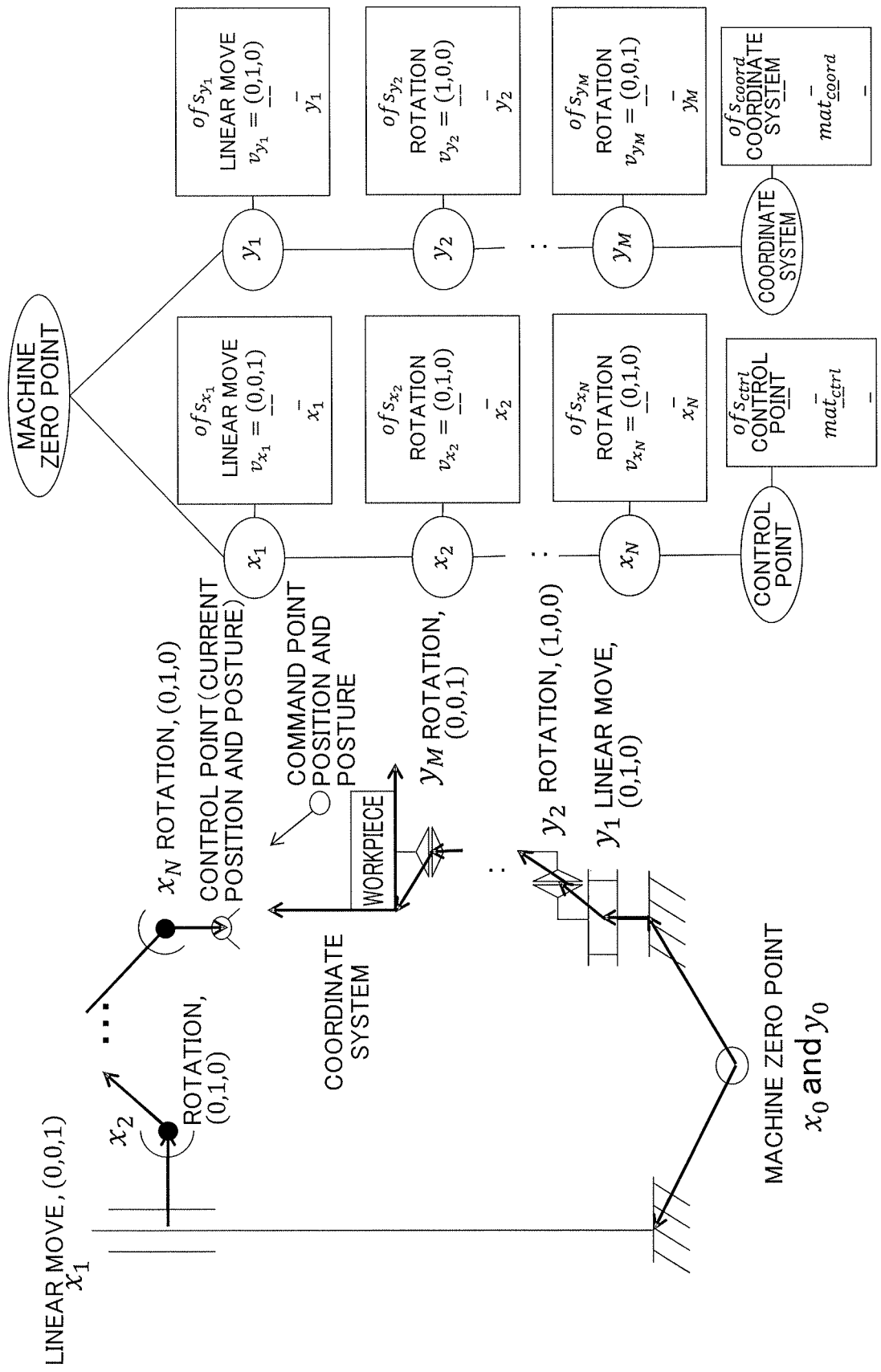
FIG. 29 is a diagram showing an example of information used when a movement pulse is generated in the embodiment of the present invention.

For example as shown in FIG. 29, it is assumed that an axis x2 is set on an axis x1, that an axis x3 is set on the axis x2, that then, N nodes are likewise continuous and that the end thereof is an axis xN. Furthermore it is assumed that on the axis xN, a control point is installed. Likewise, it is assumed that an axis y2 is set on an axis y1, that an axis y3 is set on the axis y2, that then, L nodes are likewise continuous and that the end thereof is an axis yL. Furthermore, it is assumed that on the axis yL, a workpiece is installed. Here, although xi and yi are the names of nodes, it is assumed that they simultaneously indicate the coordinate values of the individual nodes.

As shown in FIG. 30, it is assumed that addresses X, Y and Z indicating an orthogonal coordinate position and addresses I, J and K indicating a tool posture are specified by a program, and that a position $pos_w = (X_W, Y_W, Z_W)$ and a tool direction vector $vec_w = (I_W, J_W, K_W)$ are given by these addresses. As shown in FIG. 31, it is assumed that a control point [xN] and a coordinate system [yM] are specified by the program.

Here, a path $p_{ctrl}$ of the control point from the machine configuration tree route specified here and a path $p_{coord}$ of the coordinate system from the machine configuration tree route specified here are represented by [Formula 15] below.

$p_{ctrl} = \{x_0, x_1, x_2, \ldots, x_N, \text{control point}\}$ $p_{coord} = \{y_0, y_1, y_2, \ldots, y_L, \text{coordinate system}\}$ [Formula 15]

Since the accompanying paths of the control point and the coordinate system are not particularly specified by a program, the elements of the accompanying paths $a_{pctrl}$, $b_{pctrl}$, $a_{pcoord}$ and $b_{pcoord}$ or the individual paths are represented by [Formula 16] so as to be all 1.

$a_{p_{ctrl}} = \{a_{x_0}, a_{x_1}, a_{x_2}, \ldots, a_{x_N}, a_{control\ point}\} = \{1, 1, 1, \ldots, 1, 1\}$ $b_{p_{ctrl}} = \{b_{x_0}, b_{x_1}, b_{x_2}, \ldots, b_{x_N}, b_{control\ point}\} = \{1, 1, 1, \ldots, 1, 1\}$ $a_{p_{coord}} = \{a_{y_0}, a_{y_1}, a_{y_2}, \ldots, a_{y_L}, a_{coordinate\ system}\} = \{1, 1, 1, \ldots, 1, 1\}$ $b_{p_{coord}} = \{b_{y_0}, b_{y_1}, b_{y_2}, \ldots, b_{y_L}, b_{coordinate\ system}\} = \{1, 1, 1, \ldots, 1, 1\}$ [Formula 16]

Furthermore, it is assumed that the offset, the type of node (linear line/rotation/unit/control point/coordinate system), the axis direction, the posture matrix and the coordinate value shown in FIG. 29 are given to the individual nodes.

Figure 32:
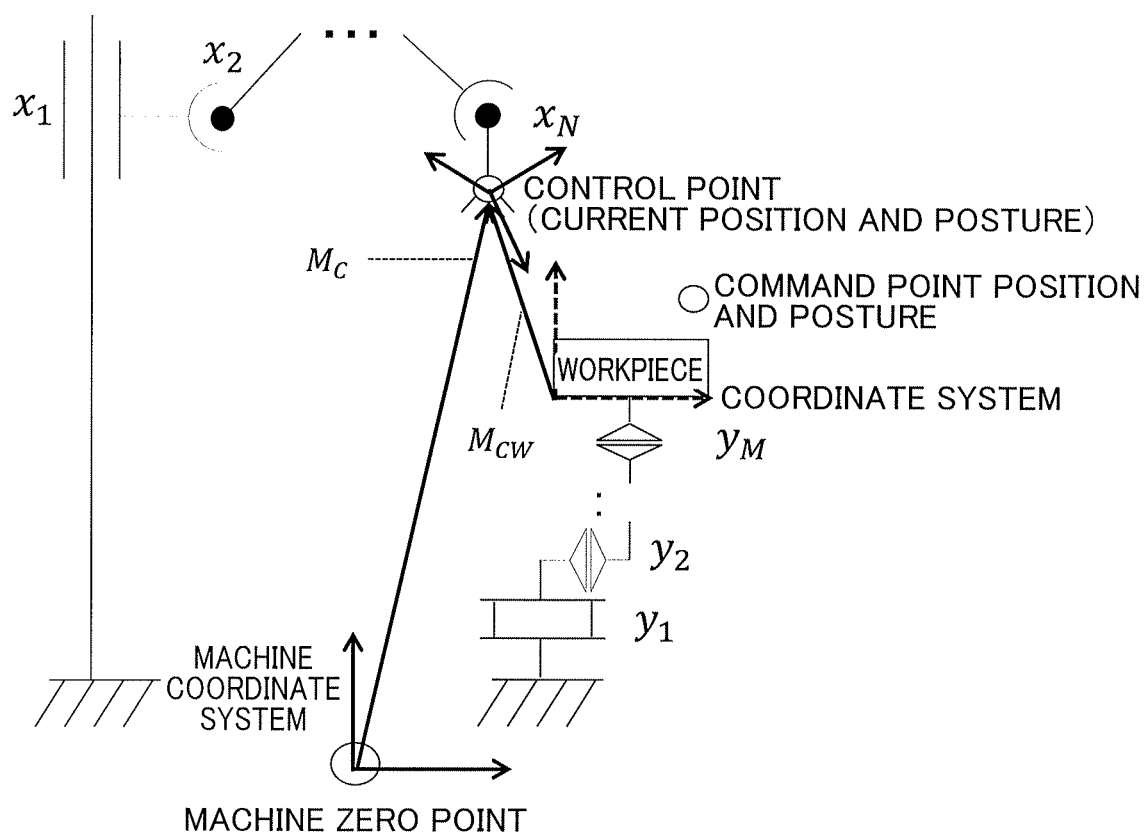
FIG. 32 is a diagram showing an example of the information used when the movement pulse is generated in the embodiment of the present invention.

Here, as shown in FIG. 32, the homogeneous matrix $M_C$ indicating the current position and posture of the control point with respect to the route (machine zero point) is determined by a formula below.

$M_C = \{\Pi_{i=1}^{N} S(a_{x_i}, b_{x_i})\} M_{[ctrl]}$ where $\Pi_{i=1}^{n} M_i = M_1 M_2 \ldots M_n$ [Formula 17]

Here, the meanings of symbols are as described in "5. Calculation method of control point position and control point posture", and thus they are omitted. A homogeneous matrix $M_{CW}$ indicating the current position and posture of the control point on the specified coordinate system is determined by a formula below by use of $M_C$.

$$M_{CW}=M_{[coord]}^{-1}\{\Pi_{i=L}{}^1 S^{-1}(a_{y_i}, b_{y_i})\}M_C \text{ where}$$
$$\Pi_{i=1}{}^n M_i = M_1 M_2 \ldots M_n \quad\quad \text{[Formula 18]}$$

Then, the current position vector $pos_{CW}$ of the control point on the specified coordinate system is determined as follows.

$$pos_{CW}=M_{CW}(0\ 0\ 0\ 1)^T \quad\quad \text{[Formula 19]}$$

Figure 33:
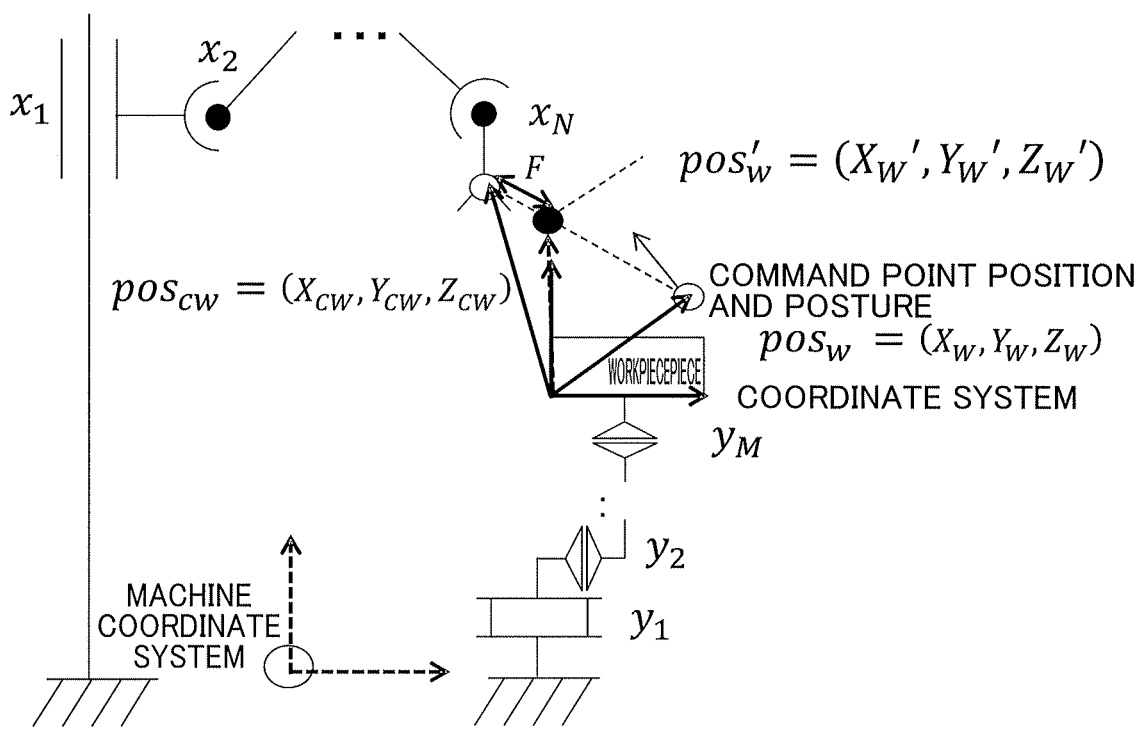
FIG. 33 is a diagram showing an example of the information used when the movement pulse is generated in the embodiment or the present invention.

Then, as shown in FIG. 33, the subsequent interpolation position vector $pos'_W$ on the specified coordinate system is determined by a formula below by use of $pos_{CW}$, $$pos'_w = pos_{cw} + F\frac{pos_w - pos_{cw}}{\|pos_w - pos_{cw}\|} \quad\quad \text{[Formula 20]}$$

where F represents a specified move speed per interpolation period. In this way, it is possible to determine the position per interpolation period on a linear line connecting the current position and the command point position in the specified coordinate system.

On the other hand, the current tool direction vector $vec_{CW}$ of the control point on the specified coordinate system is determined as follows with the assumption that the tool reference direction vector is (0, 0, 1, 0).

$$vec_{CW}=M_{CW}(0\ 0\ 1\ 0)^T \quad\quad \text{[Formula 21]}$$

The tool reference direction vector is not limited to the tool reference direction vector described above, and may be changed by a command, a parameter setting or the like.

Figure 34:
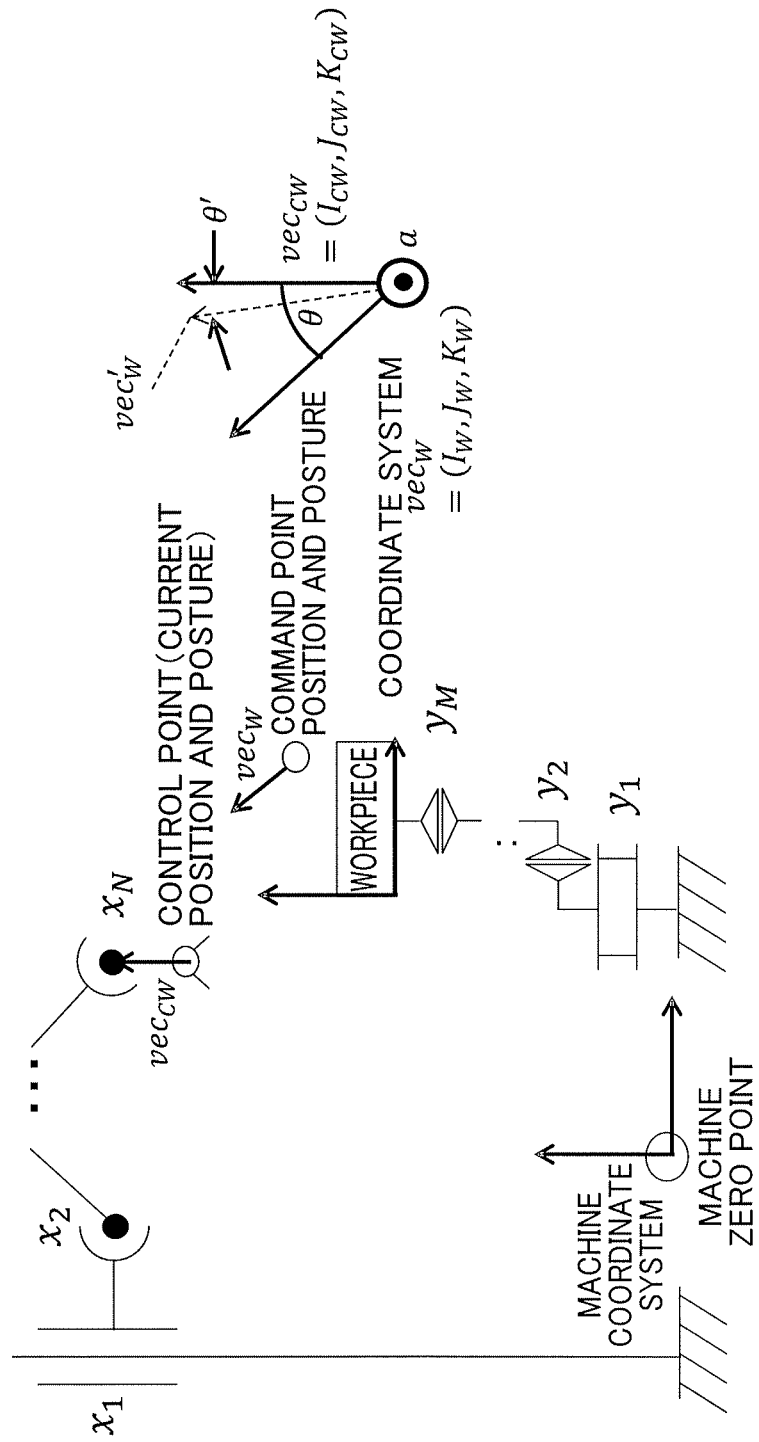
FIG. 34 is a diagram showing an example of the information used when the movement pulse is generated in the embodiment of the present invention.

Then, as shown in FIG. 34, the subsequent interpolation tool direction vector $vec'_W$ of the control point on the specified coordinate system is determined by a formula below, $$\theta = \cos^{-1}(vec_{cw} \cdot vec_w) \quad\quad \text{[Formula 22]}$$
$$\theta' = \frac{\|pos'_w - pos_{cw}\|}{\|pos_w - pos_{cw}\|}\theta$$
$$axis = \frac{vec_{cw} \times vec_w}{\|vec_{cw} \times vec_w\|}$$
$$vec'_w = Rot(\theta', axis)$$

where the description of a symbol is as follows. Rot (θ', axis): Rotary matrix rotated in a vector axis direction by θ' which is the same as in the description of a matrix R in [Formula 7].

As described above, the subsequent interpolation position vector $pos'_W$ and the subsequent interpolation tool direction vector $vec'_W$ are determined, and then the following simultaneous equation is set up for each of the position and the posture of the control point.

$$\left\{\prod_{i=1}^{N} S(a_{x_i}, b_{x_i})\right\} M_{[ctrl]} \begin{pmatrix} 0 & 0 & 0 & 1 \\ 0 & 0 & 1 & 0 \end{pmatrix}^T = \quad \text{[Formula 23]}$$
$$\left\{\prod_{i=1}^{L} S(a_{y_i}, b_{y_i})\right\} M_{[coord]} \begin{pmatrix} pos'_w & 1 \\ vec'_w & 0 \end{pmatrix}^T$$

This simultaneous equation is solved with respect to each of $x_i$ and $y_i$, and thus the subsequent interpolation position of each axis is determined.

When the simultaneous equation is solved, it is possible to calculate the solution by use of, for example, a Gröbner basis. Specifically, based on a lexicographic order $x_1 > x_2 > \ldots > x_N > y_1 > y_2 > \ldots y_M$, for example, a Buchburger algorithm or the like is used so as to determine the Gröbner basis of the simultaneous equation, and thus a unitary multidimensional equation with respect to the least significant order $y_M$ is determined. This equation is solved so as to determine the solution of $y_M$, this solution is used so as to sequentially solve the equations with respect to other Gröbner bases and thus it is possible to determine the solution of the simultaneous equation described above with respect to each of $x_i$ and $y_i$.

The solutions $x_i'$ and $y_i'$ determined in this way are used so as to output the amount of move of $\Delta x_i' = x_i' - x_i$, $\Delta y_i' = y_i' - y_i$ to each axis, and thus it possible to realize a move at a specified speed on the specified coordinate system.

When the flexibility of the machine configuration is redundant, for example, it is possible cope with such a case by adding, in a simultaneous manner, to the mathematical formula of [Formula 23], a restraint condition in which some axes are not moved or which a command value is directly given to some axes. It is also possible to cope with it by a method of making some axes have the attribute of an auxiliary axis which is not normally moved and moving the axes only in the vicinity of a singular point only for an operation of avoiding the singular point. It is also possible to cope with it by adding an auxiliary control point and issuing a command to it.

Even when the flexibility of the machine configuration is not redundant, a command value is directly given to some axes, and thus it is possible to omit the simultaneous state of the simultaneous equation. For example, in order to distinguish a rotary axis in which as the coordinate value is varied, the tool direction of the control point with respect to the specified coordinate system is varied from a rotary axis which does not contribute to a variation in the tool direction, the rotary axis is referred to as a tool variation rotary axis, and it is assumed that information as to whether or not each node of the machine configuration tree is the tool variation rotary axis is possessed. It is also assumed that the individual paths from the route to the control point and from the route to the coordinate system are represented by the mathematical formula of [Formula 15], and that a list of tool variation rotary axis nodes included in the individual paths is the mathematical formula of [Formula 24].

$$\{x_n, y_m\} \quad\quad \text{[Formula 24]}$$

Figure 35:
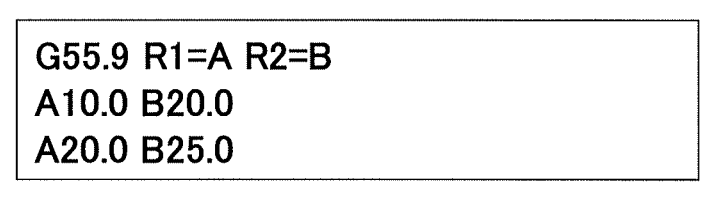

Among the tool variation rotary axes on the side of the control point, sequentially from the farthest one from the route, the first and the second are provided, and thereafter among the tool variation rotary axes on the side of the coordinate system, sequentially from the farthest one from the route, the third and the fourth are provided, with the result that it is possible to strictly define the order of the tool variation rotary axes for any machine configuration tree. Hence, xn is referred to as the first tool variation rotary axis, and ym is referred to as the second tool variation rotary axis. Here, an identifier R1 representing the first tool variation rotary axis and an identifier R2 representing the second tool variation rotary axis are used, and thus a command is issued as shown in FIG. 35. The addresses A and B specified in this way are used, and thus not the tool direction vector but the angle value of the tool variation rotary axis can be directly commanded.

In this case, the subsequent interpolation positions xn' and yn' of the first tool variation rotary axis and the second tool variation rotary axis can be determined by a formula below.

When command values for $x_n$, $y_m$ [Formula 25]

are assumed to be $x_{nw}$, $y_{mw}$ $$x'_n = x_n + \frac{\|pos'_w - pos_{cw}\|}{\|pos_w - pos_{cw}\|}(x_{nw} - x_n)$$

$$y'_m = y_m + \frac{\|pos'_w - pos_{cw}\|}{\|pos_w - pos_{cw}\|}(y_{mw} - y_m)$$

In this way, the node coordinate values of the first tool variation rotary axis and the second tool variation rotary axis are determined, and thus the tool dire vector is also determined. Hence, it is not necessary to solve the simultaneous equation with respect to the tool direction vector, and thus the following simultaneous equation with respect to the command position is only solved.

$$\{\Pi_{i=1}^{N} S(a_{x_i}, b_{x_i})\} M_{[ctrl]} (0\ 0\ 0\ 1)^T = \{\Pi_{i-1}^{L} S(a_{y_i}, b_{y_i})\} M_{[coord]} (pos'_w\ 1)^T$$ [Formula 26]

However, in the equation described above, as the coordinate values of nodes xn and yn, the values determined as described above are substituted, and thus the equation is solved while they are regarded as constants.

As described above, as the command value in the program, the coordinate value of the specific node can be directly specified. In this way, it is possible to reduce the number of simultaneous equations.

[10. Effects of the Present Embodiment]

The numerical controller according to the present embodiment holds machine configuration information in, for example, a machine configuration graph form such as a machine configuration tree. The numerical controller according to the present embodiment makes, on the machine configuration graph, each node have the information necessary for each node being the control point or the coordinate system when the graph is produced or automatically inserts possible control points and coordinate systems into the machine configuration graph, and provides a uniquely identifiable identifier to each of the control points and the coordinate systems. Hence, the user of the numerical controller according to the present embodiment can specify, with the identifier, the desired control point and coordinate system on a NC program without changing the setting of the numerical controller, with the result that convenience is enhanced.

Furthermore, the numerical controller according to the present embodiment specifies a control point and a coordinate system in the machine configuration, then commands coordinate value and thereby can move the specified control point to the coordinate on the specified coordinate system. In this way, the user of the numerical controller can freely issue a movement command to a machine of a general machine configuration with the result that convenience is enhanced.

Although the embodiment of the present invention is described above, the present invention is not limited to the embodiment described above. The effects described in the present embodiment are obtained by simply listing preferred effects produced from the present invention, and the effects of the present invention is not limited to the effects described in the present embodiment.

The method of controlling the numerical controller 100 is realized by software. When it is realized by software, programs forming the software are installed into a computer (the numerical controller 100). These programs may be distributed to users by being recorded in removable media or may be distrusted by being downloaded into the computers of the users through a network. Furthermore, these programs may be provided to the computers (the numerical controllers 100) of the users as a Web service through a network without being downloaded.

EXPLANATION OF REFERENCE NUMERALS

11 CPU
100 numerical controller
111 graph generation portion
112 control point coordinate system insertion portion
113 identifier allocation portion
114 control point coordinate system specification portion
115 command value determination portion
116 movement command portion
161 simultaneous equation generation portion
162 simultaneous equation solving portion
163 movement pulse generation portion

What is claimed is:

1. A numerical controller that expresses a machine configuration of a control target in a graph form where constituent elements are nodes and that holds the machine configuration, the numerical controller comprising:

a memory; and
a processor, wherein the processor executes a program stored in the memory to perform operations comprising:
  inserting a control point and a coordinate system into each of the nodes in the graph of the machine configuration by making each of the nodes in the graph of the machine configuration have the control point and the coordinate system as information;
  allocating an identifier to the control point and the coordinate system inserted;
  specifying, with the identifier, one or more groups of the control point and the coordinate system;
  using the control point and the coordinate system so as to determine for which control point and on which coordinate system one or more command values commanded in a program correspond to a coordinate value; and
  commanding a move of the control point such that the coordinate value of the control point is the command value by using the graph form which expresses the machine configuration where constituent elements are nodes for moving the constituent elements included in the machine configuration of the control target,
wherein the graph form of the machine configuration of the control target is a hierarchical tree structure in which the nodes are arranged with respect to a machine zero point in the coordinate system, each of the nodes containing information related to a workpiece or a tool, and
wherein the control point corresponds to a point that exists in a real space, and the coordinate system corresponds to a coordinate system that indicates a position in the real space.

2. The numerical controller according to claim 1, wherein the graph of the machine configuration can include, as the constituent element, a unit in which a plurality of axes are integrated into one.

3. The numerical controller according to claim 2, wherein a script described by a user is analyzed so as to define the unit, and the defined unit can be included as the constituent element in the graph of the machine configuration.

4. The numerical controller according to claim 1, wherein the coordinate system can be prevented from being affected by a specific node.

5. The numerical controller according to claim 1, wherein the control point can be prevented from being affected by a specific node.

6. The numerical controller according to claim 1, wherein an arbitrary address which is allocated to an identifier previously defined for each meaning is used as the command value regardless of an axis name included in the graph of the machine configuration.

7. The numerical controller according to claim 6, wherein the meaning includes a position of the control point, a posture of the control point and an angle position of a rotary axis for determining the posture.

8. The numerical controller according to claim 1, wherein the coordinate value of a specific node can be directly specified as the command value.

9. The numerical controller according to claim 1, wherein the processor is further configured to perform operations comprising:
generating a hypercomplex multidimensional simultaneous equation which determines a first coordinate transformation formula of the command value from the specified coordinate system and the graph of the machine configuration, which determines a second coordinate transformation formula of the control point from the specified control point and the graph of the machine configuration and which defines that the first coordinate transformation formula is equal to the second coordinate transformation formula;
determining a solution of the hypercomplex multidimensional simultaneous equation; and
using the solution of the hypercomplex multidimensional simultaneous equation so as to generate a movement pulse used for a movement command.

10. The numerical controller according to claim 9, wherein the processor is further configured to perform an operation of directly specifying the coordinate value of a specific node so as to reduce the number of simultaneous equations.

11. A numerical controller that expresses a machine configuration of a control target in a graph form where constituent elements are nodes and that holds the machine configuration, the numerical controller comprising:
a memory; and
a processor, wherein the processor executes a program stored in the memory to perform operations comprising:
inserting, as a node, a control point and a coordinate system into each of the nodes in the graph of the machine configuration;
allocating an identifier to the control point and the coordinate system inserted;
specifying, with the identifier, one or more groups of the control point and the coordinate system;
using the control point and the coordinate system so as to determine for which control point and on which coordinate system one or more command values commanded in a program correspond to a coordinate value; and
commanding a move of the control point such that the coordinate value of the control point is the command value by using the graph form which expresses the machine configuration where constituent elements are nodes for moving the constituent elements included in the machine configuration of the control target,
wherein the graph form of the machine configuration of the control target is a hierarchical tree structure in which the nodes are arranged with respect to a machine zero point in the coordinate system, each of the nodes containing information related to a workpiece or a tool, and
wherein the control point corresponds to a point that exists in a real space, and the coordinate system corresponds to a coordinate system that indicates a position in the real space.

12. A non-transitory computer readable recording medium having stored thereon a data structure that expresses a machine configuration of a control target of a numerical controller and that is in a graph form where constituent elements are nodes, wherein a control point and a coordinate system are inserted as a node into a graph of the machine configuration, and an identifier is allocated to each of the control point and the coordinate system, wherein the control point and the coordinate system is used to determine for which control point and on which coordinate system one or more command values commanded in a program correspond to a coordinate value, wherein a move of the control point is commanded such that the coordinate value of the control point is the command value by using the graph form which expresses the machine configuration where constituent elements are nodes for moving the constituent elements included in the machine configuration of the control target, wherein the graph form of the machine configuration of the control target is a hierarchical tree structure in which the nodes are arranged with respect to a machine zero point in the coordinate system, each of the nodes containing information related to a workpiece or a tool, and wherein the control point corresponds to a point that exists in a real space, and the coordinate system corresponds to a coordinate system that indicates a position in the real space.

* * * * *